(12) United States Patent
Cheng

(10) Patent No.: US 6,661,417 B1
(45) Date of Patent: *Dec. 9, 2003

(54) SYSTEM AND METHOD FOR CONVERTING AN OUTLINE FONT INTO A GLYPH-BASED FONT

(75) Inventor: Kuo-Young Cheng, Taichung Hsien (TW)

(73) Assignee: DynaLab Inc., Taipei (TW)

( * ) Notice: Subject to any disclaimer, the term of this patent is extended or adjusted under 35 U.S.C. 154(b) by 463 days.

This patent is subject to a terminal disclaimer.

(21) Appl. No.: 09/649,378

(22) Filed: Aug. 28, 2000

(51) Int. Cl.⁷ .............................................. G06T 11/00
(52) U.S. Cl. ...................................................... 345/469
(58) Field of Search .......................... 345/441, 467–472

(56) References Cited

U.S. PATENT DOCUMENTS

| | | |
|---|---|---|
| 4,897,638 A | 1/1990 | Kokunishi et al. |
| 4,990,903 A | 2/1991 | Cheng et al. |
| 5,119,296 A | 6/1992 | Zheng et al. |
| 5,212,769 A | 5/1993 | Pong |
| 5,450,096 A | 9/1995 | Yoshida et al. |
| 5,579,416 A | 11/1996 | Shibuya et al. |
| 5,594,855 A | 1/1997 | Von Her, II et al. |
| 5,727,140 A | 3/1998 | Ohtomo et al. |
| 5,734,748 A | 3/1998 | Amano |
| 5,852,448 A | 12/1998 | Cheng |
| 6,151,032 A | 11/2000 | Cheng |
| 6,157,390 A | 12/2000 | Cheng |

OTHER PUBLICATIONS

Cheng, K.–Y., U.S. patent application No. 09/425,449 filed on Oct. 22, 1999 (under examination).

*Primary Examiner*—Matthew Luu
(74) *Attorney, Agent, or Firm*—Christensen O'Connor Johnson Kindness PLLC

(57) ABSTRACT

A method for automatically converting an outline font character into a glyph-based font character using a set of predefined basic glyphs stored in a glyph database is provided. Each basic glyph is predefined as a program for rendering the basic glyph for output. Additionally, each basic glyph is associated with a glyph signature consisting of feature points, and script sentences that obtain key points and width values based on the feature points. According to the automatic font conversion method, first, an outline font character to be redefined is captured. Then, one glyph is selected from the captured character. Thereafter, feature points are identified along the outline of the selected glyph and stored in a glyph signature. Next, the glyph database is searched and a basic glyph that topographically matches the selected glyph is retrieved. Next, the script sentences associated with the retrieved basic glyph are used together with the identified feature points of the selected glyph to obtain key points and width values for the selected glyph. Thereafter, the selected glyph with its key points and width values is stored as a program for rendering the selected glyph for output. At this point, the selected glyph is fully defined. The process of defining a selected glyph is repeated for all glyphs included in the captured outline font character, i.e., until the outline font character is fully redefined based on its glyphs into a glyph-based font character. The glyph-based font is suited for font communication between different systems having different resolutions.

20 Claims, 24 Drawing Sheets

SYSTEM AND METHOD FOR CONVERTING AN OUTLINE FONT INTO A GLYPH-BASED FONT

FIELD OF THE INVENTION

The present invention relates to digital representations of typographic characters or other symbols, and more particularly, to a system, method, and computer-readable medium for converting an outline font into a glyph-based font.

BACKGROUND OF THE INVENTION

Many font generating systems exist for generating Asian character fonts ("Asian fonts"). An Asian font is composed of a large number of ideographs that represent the characters in the Asian language. Asian languages may include thousands of characters. For example, the Chinese language includes over twenty thousand distinct characters.

One conventional computer technique for generating character patterns in an Asian font uses font outlines. This system is described in "PostScript Language Tutorial and Cookbook" by Adobe Systems, Inc. (Addison-Wesley Publishing, 1985). In this method, the outline of a character pattern is stored as a collection of straight lines and curves. There are some disadvantages associated with this technique. First, because different font outlines must be defined and stored for tens of thousands of different characters, the memory requirement is relatively high. Second, the font outlines that are stored in high resolution are suited for display only in high resolution; they are not suited for high-quality display in relatively low resolution. Third, an outline font is not suited for communication between different systems, in particular different systems having different resolutions, due to the relatively high memory requirement and also due to the inability to adjust to both high- and low-resolution displays.

To overcome these disadvantages associated with an outline font, a method for generating a glyph-based font has been proposed, and is described in copending U.S. patent application Ser. No. 09/425,449 (filed Oct. 22, 1999), which is assigned to the assignee of the present application and explicitly incorporated herein. As used herein, a glyph is a subunit of an Asian character; an Asian character typically consists of one or more glyphs. Each glyph, in turn, is formed of one or more strokes. In the glyph-based font, each character is defined as a combination of glyphs, and each glyph is defined separately. The glyph-based font has a low memory requirement, is capable of displaying characters in both high and low resolutions, and thus is well suited for font communication between different systems having different resolutions.

To take advantage of the glyph-based font suitable for font communication, a need exists for a system, method, and computer-readable medium for automatically converting any captured outline font found in a document into a glyph-based font so that the document can be freely communicated between different systems having different resolutions.

SUMMARY OF THE INVENTION

The present invention provides a method and system for defining a set of basic glyphs. The invention further provides a method and computer-readable medium having computer-executable instructions for automatically converting an outline font into a glyph-based font using the predefined basic glyphs. The glyph-based font of the present invention has a low memory requirement, is suitable for font communication between different computers, and can be rendered in high quality on both high- and low-resolution output devices.

Specifically, a method and system for defining a set of basic glyphs for defining glyphs and characters based thereon are provided. According to the method, first, a set of characters that include similarly shaped glyphs is retrieved. Next, one basic glyph is selected, which best represents all the similarly shaped glyphs topographically. For the selected basic glyph, feature points are defined along the outline of the basic glyph. The defined feature points are then stored as a glyph signature. A glyph signature represents the structure in which all feature points of a glyph are arranged. Generally, all glyphs that one basic glyph topographically represents share the same glyph signature. Next, key points are defined for the selected basic glyph. Generally, key points are placed at the beginning and terminus of a basic glyph and at any location where a basic glyph changes direction abruptly. Next, width values are defined for the selected basic glyph. Width values are defined on the basic glyph so that the shape of the basic glyph can be manipulated to match any of the similarly shaped glyphs that the basic glyph represents by decreasing or increasing the width values. Thereafter, for the selected basic glyph, equations are defined that obtain the feature points based on the key points and the width values of the selected basic glyph. Then, script sentences are defined that obtain the key points and the width values based on the feature points of the selected basic glyph. At this point, the selected basic glyph is fully defined and is stored as a program for rendering the basic glyph for output. The above process is then repeated for another basic glyph, until all glyphs included in the retrieved set of characters are represented by at least one basic glyph.

In accordance with one aspect of the present invention, the step of identifying feature points along the outline of a glyph may be performed automatically. According to the automatic process, first, a glyph is fitted within a minimum square. Then, feature points are identified at the leftmost, lowermost, rightmost, and uppermost edges of the minimum square. At this time, if all curve segments between two consecutive feature points are not on the same side of the line connecting the two feature points, feature points are identified at inflection points. Further, any acute-angle points are identified as feature points. Thereafter, a minimum square is formed for each pair of two adjacent feature points. If any curve segment between the two feature points lies outside the minimum square, the minimum square is expanded until it contains all curve segments between the two feature points and feature points are identified at the leftmost, lowermost, rightmost, and uppermost edges of the minimum square.

In accordance with another aspect of the present invention, the basic glyph definition process may further include the step of defining curve ratios for creating curve segments between adjacent feature points of a basic glyph. Curve ratios are defined at various resolution levels and stored in a tree-structure curve level table. Curve ratios are defined in greater detail at a higher resolution level and in less detail at a lower resolution level. Thus defined curve segments are rendered in equally high quality on both high-resolution output devices and low-resolution output devices.

In accordance with yet another aspect of the present invention, the basic glyph is divided into one or more single run-length regions. A single run-length region is an area within the basic glyph that contains no holes and can be filled with a single scan run. Thus, storing the basic glyph as a collection of several single run-length regions makes it simpler to fill within the basic glyph.

In accordance with still another aspect of the present invention, any key point that requires a specific display location with respect to a bitmap cell upon which the key point falls may be labeled with hint information. Labeling key points with hint information serves to avoid jamming or distortion of a glyph upon display, in particular in low resolution.

The present invention further provides a method and computer-readable medium having computer-executable instructions for automatically converting an outline font character into a glyph-based font character using a set of predefined basic glyphs stored in a basic glyph database. As described above, each of the basic glyphs is predefined as a program for rendering the basic glyph for output. Additionally, each of the basic glyphs is associated with a glyph signature consisting of feature points of the basic glyph, and is further associated with script sentences that obtain key points and width values based on the feature points of the basic glyph. According to the automatic font conversion method, first, an outline font character to be redefined is captured. Then, a glyph is selected from the captured character. Thereafter, feature points are identified automatically along the outline of the selected glyph and stored in a glyph signature. Next, the basic glyph database is searched for a basic glyph that topographically matches the selected glyph, and this basic glyph is retrieved. Next, the script sentences associated with the retrieved basic glyph are retrieved, and used together with the feature points of the selected glyph identified above to obtain key points and width values for the selected glyph. Thereafter, the selected glyph with its key points and width values is stored as a program for rendering the selected glyph for output. At this point, the selected glyph is fully redefined. The above process of defining the selected glyph is repeated for all glyphs included in the captured outline font character, i.e., until the outline font character is fully redefined based on its glyphs into a glyph-based font character.

In accordance with one aspect of the present invention, when the basic glyph database is searched for a basic glyph that topographically matches the selected glyph, a basic glyph whose glyph signature matches the glyph signature of the selected glyph is retrieved.

In accordance with another aspect of the present invention, the program for rendering each basic glyph for output includes equations for obtaining the feature points of the basic glyph based on the key points and width values of the basic glyph. The program further includes curve ratios stored in a curve level table for creating curve segments between adjacent feature points. When the program for rendering the selected glyph is created, such a program includes the equations and the curve ratios of the retrieved basic glyph that topographically matches the selected glyph.

In accordance with yet another aspect of the present invention, the program for rendering each basic glyph for output further includes a filling algorithm including one or more single run-length regions. When the program for rendering the selected glyph is created, such a program further includes the filling algorithm of the retrieved basic glyph that topographically matches the selected glyph.

The present invention offers a system, method, and computer-readable medium for automatically converting an outline font into a glyph-based font using a set of predefined basic glyphs. The glyph-based font of the present invention defines each character with glyphs, and further defines each glyph based on a basic glyph, thereby significantly lowering the memory requirement needed to generate numerous characters. The glyph-based font thus has a low memory requirement and is highly suited for font communication between various devices. Furthermore, the glyph-based font is suited for high-quality display regardless of the resolution level of a particular output device used, and therefore is well suited for font communication between different systems having different resolutions.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Figure 1A:
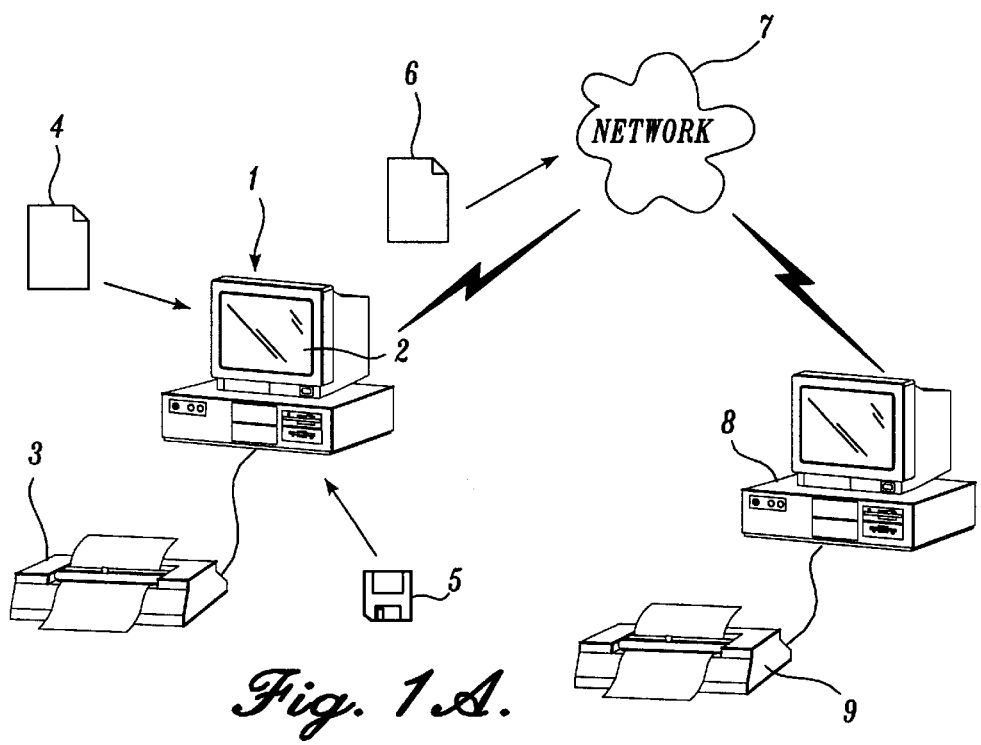
FIG. 1A is a block diagram depicting a general environment, in which the present invention operates.

FIG. 1A illustrates a typical computing environment, in which a method of the present invention may be implemented. A source computer 1 including a display 2 and connected to an output device 3 is capable of performing the method of the present invention. The source computer 1 receives a source document 4 including characters encoded in an outline font. The source document 4 may be loaded to the source computer 1 via scanning, from a disk 5, or by any other suitable means, and may have been created on the source computer 1 itself. The source computer 1 then converts the source document 4 into an output document 6 including characters encoded in a glyph-based font. The output document 6 encoded in a glyph-based font is well suited for efficient transmission, such as through a network 7, to a destination computer 8 connected to an output device 9. The output device 9 of the destination computer 8 may have either high or low resolution, which may be different from the resolution of the display 2 or the output device 3 of the source computer 1, and still is capable of rendering the output document 6 in high-quality appearance.

The source computer 1 and the destination computer 8 may be one or more of any general purpose computing devices, including personal computers, workstations, minicomputers, mainframes, multiprocessor systems, and the like. The network 7 may be implemented as a direct connection, a local area network, a wide area network, or a global network such as the Internet.

Figure 1B:
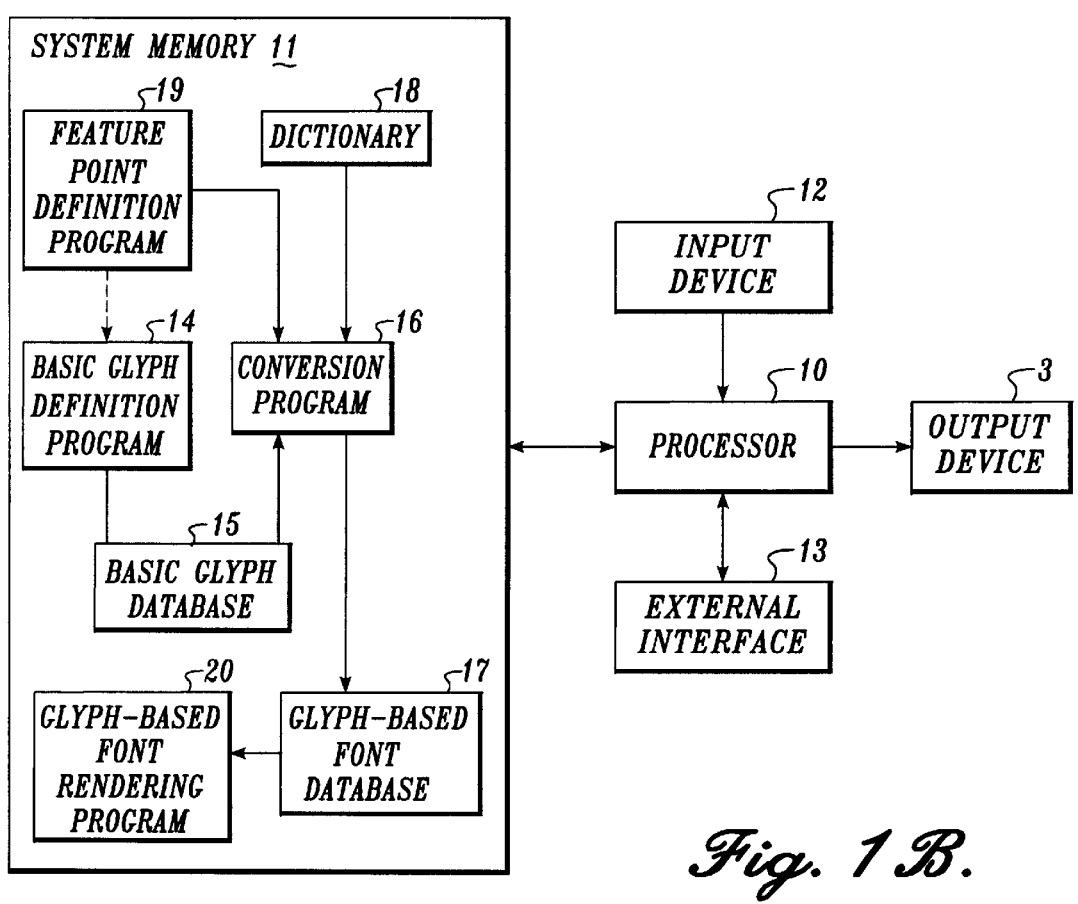
FIG. 1B is a block diagram illustrating basic functional components of a computer for practicing the invention.

FIG. 1B depicts several key components of the source computer 1. The source computer 1 includes a processor 10. The source computer 1 further includes a system memory 11, an input device 12, an output device 3, and an external interface 13, which are all coupled to the processor 10. The input device 12 may be a keyboard, mouse, light pen, digitizing pad, scanner, or any other device as known in the art, which is operated to control or enter data into the source computer 1. The output device 3, shown in FIG. 1A as a printing device, may be a monitor, plotter, or any other device known in the art. The external interface 13 is provided to allow the source computer 1 to communicate with the external world, and may include one or more of a modem and a network interface card.

The system memory 11 may include one or more of a read-only memory, a random-access memory, and a permanent storage device, such as a hard disk drive, tape drive, optical drive, floppy disk drive, or combination thereof. The system memory 11 stores a basic glyph definition program 14 for defining basic glyphs. Defined basic glyphs are stored in a basic glyph database 15. The system memory also stores a conversion program 16 for automatically converting an outline font character into a glyph-based font character using the predefined basic glyphs stored in the basic glyph database 15. Glyph-based font characters generated by the conversion program 16 are stored in a glyph-based font database 17. The conversion program 16 is further coupled to a dictionary 18, which stores information about various outline fonts to be converted into a glyph-based font, as more fully described below with reference to FIG. 4B. The conversion program 16 is also adapted to retrieve a feature point definition program 19, which is used to automatically identify feature points along a glyph outline, as will be fully described below with reference to FIGS. 4B and 4C. The feature point definition program 19 may be retrievable also by the basic glyph definition program 14. The system memory 11 may further store a glyph-based font rendering program 20 for rendering a glyph-based font character in high quality in both high and low resolutions, which is coupled to the glyph-based font database 17. These programs 14, 16, 19, 20 may be implemented by the source computer 1 as computer-executable instructions, such as program modules. Generally, program modules include routines, programs, objects, components, data structures, etc. that perform particular tasks or implement particular data types. As will be apparent to those skilled in the art, any of the components in the system memory 11 may be stored in one or more remote computers and accessed by the source computer 1 through a communications medium such as the network 7.

Figure 2:
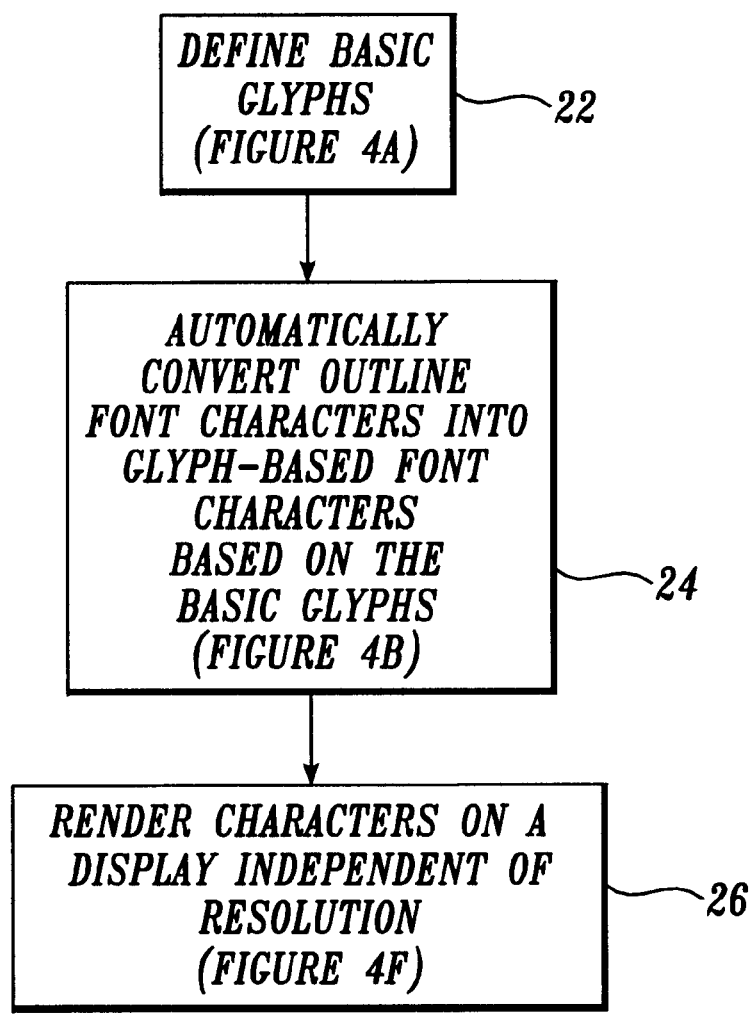
FIG. 2 is a flowchart illustrating three basic steps of a method of the present invention.
Figure 3A:
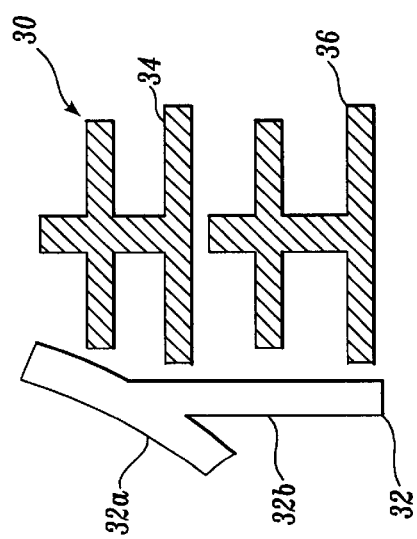
FIGS. 3A–3D depict sample Chinese characters, wherein each character includes a plurality of glyphs, and each glyph includes a plurality of strokes.
Figure 3B:
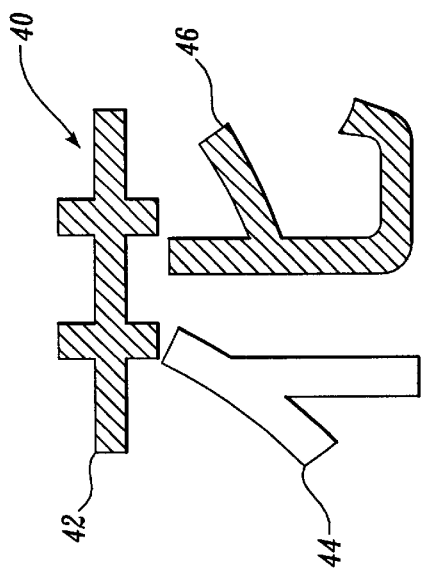
Figure 3C:
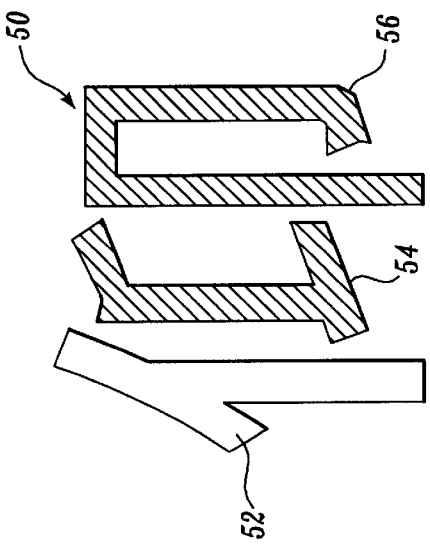
Figure 3D:
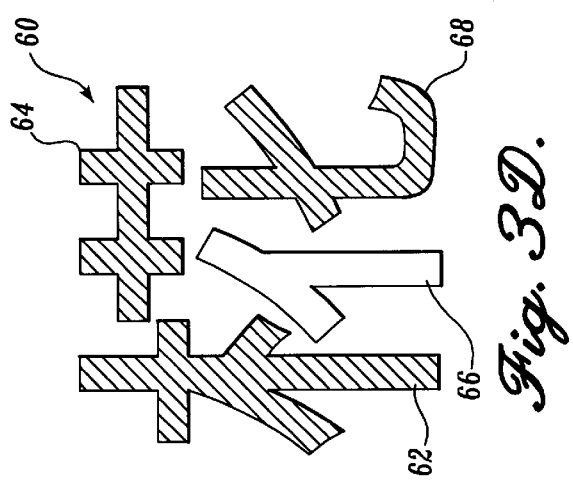

FIG. 2 illustrates basic steps performed by the present invention. The first step, at block 22, defines a finite number of "basic glyphs. As briefly discussed in the background section, a glyph is a subunit of an Asian character; an Asian character typically consists of one or more glyphs. Each glyph, in turn, consists of one or more strokes. Referring to FIG. 3A, for example, a character 30 consists of three glyphs 32, 34, and 36; a character 40 in FIG. 3B consists of three glyphs 42, 44, and 46; a character 50 in FIG. 3C includes three glyphs, 52, 54, and 56; and a character 60 in FIG. 3D includes four glyphs 62, 64, 66, and 68. It is noted that the glyphs 32, 44, 52, and 66 (white portion in each character) all have the same topographical structure, consisting of a mildly curved slanting stroke 32a and a straight vertical stroke 32b in glyph 32. Thus, the four glyphs 32, 44, 52, and 66 can be defined based on a "basic glyph" (for example, the glyph 32), as the same as or slightly modified versions of the "basic glyph" 32. One of the features of Asian languages is that many glyphs are shared by many characters, and many glyphs share the same topographical structure, as demonstrated in FIGS. 3A–3D. Thus, by redefining an outline font character with glyphs, and further defining each glyph based on a "basic glyph", the method of converting an outline font into a glyph-based font of the present invention significantly lowers the memory requirement needed to generate numerous Asian characters. The step of defining a finite number of basic glyphs will be more fully described below in reference to FIG. 4A.

The next step at block 24 involves automatically converting outline font characters into glyph-based font characters using the basic glyphs predefined in block 22. Specifically, each outline font character is redefined as a combination of one or more glyphs, wherein each glyph is defined based on a certain predefined basic glyph. This step of automatic conversion will be more fully described below in reference to FIG. 4B.

Finally, when all outline font characters have been converted into glyph-based font characters, at block 26, the glyph-based font characters may be rendered for high-quality display, regardless of the resolution level of a particular output device used. This rendering step will be described below in reference to FIG. 4F.

Figure 4A:
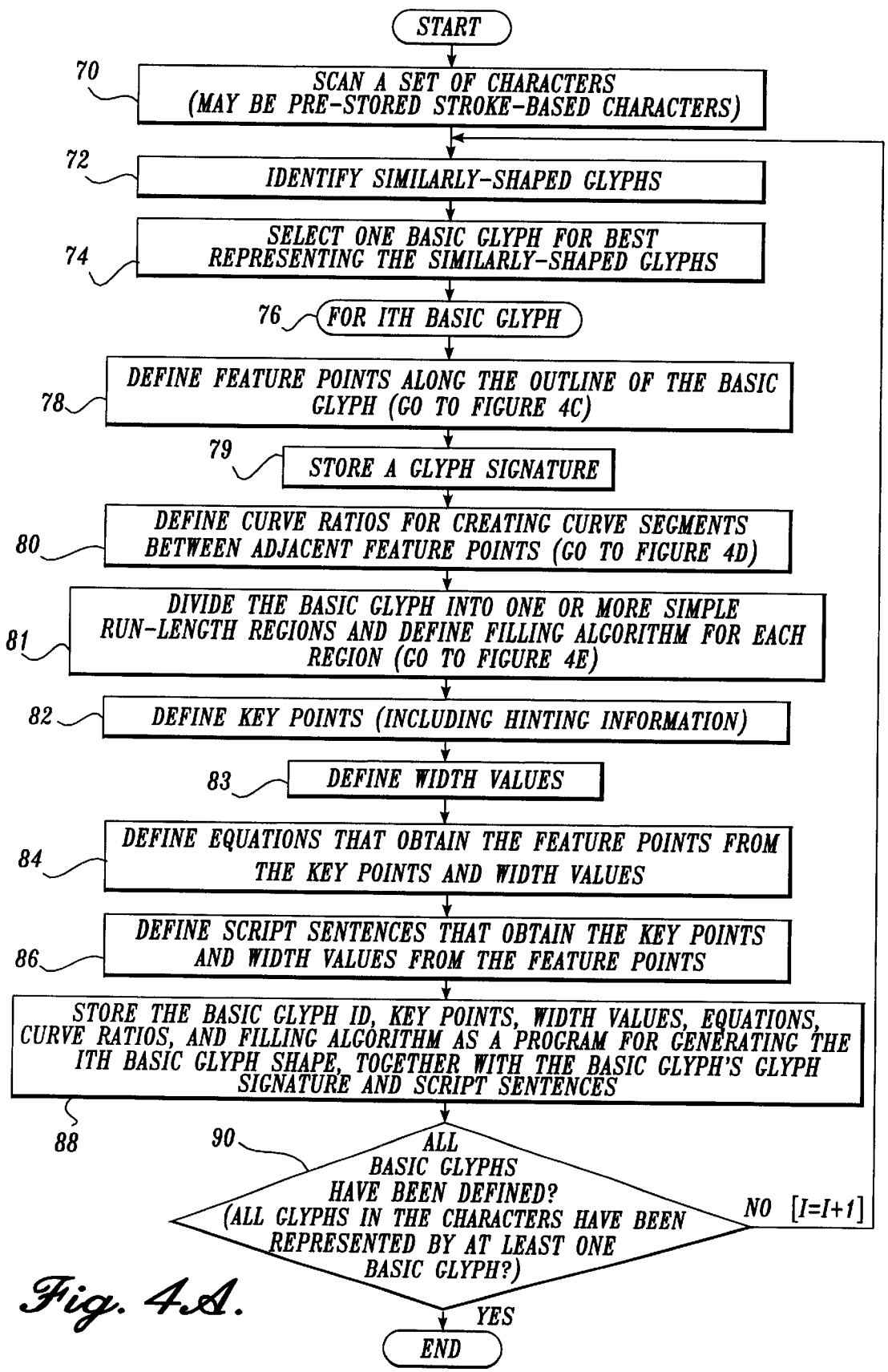
FIGS. 4A–4E are flowcharts depicting a method of defining basic glyphs and a method of automatically converting an outline font into a glyph-based font based on the predefined basic glyphs, in accordance with the present invention.

FIG. 4A illustrates the process of defining a finite number of "basic glyphs", which are key components used for defining various glyphs that constitute each Asian character. This process is generally performed by the basic glyph definition program 14 (FIG. 1B), which may allow for some user intervention.

At block 70, a font designer scans in or generates, through the use of a graphic program, a set of Asian characters. Other techniques may be used, provided that a set of character images or outlines is usable as a template. Optionally, the font designer may scan in characters that are predefined as stroke-based characters. The method of stroke-based character definition is described in U.S. patent application Ser. No. 08/717,172 (filed Sep. 20, 1996) and U.S. Pat. No. 5,852,448, both assigned to the assignee of the present application and explicitly incorporated herein. Briefly, this method defines each stroke that forms a glyph (which in turn forms a character) with explicit data (key points, width values) and implicit data (feature points and curve ratios stored in a tree structure). The explicit and implicit data are also used in defining glyphs in the present invention and, thus, it may be advantageous to scan in prestored stroke-based characters because the same explicit and implicit data may be reused.

After a set of characters is scanned or generated as a template at block 70, at block 72, the method identifies a group of similarly shaped glyphs. The identification of similar glyphs may be done as simply as a font designer visually scanning the set of characters, or automatically scanning the set of characters by image analysis techniques as known in the art.

Next, at block 74, the method selects one glyph out of a group of similarly shaped glyphs as a "basic glyph", which can best represent the topography of the similarly shaped glyphs within that group. Preferably, a "basic glyph" is selected as the most commonly appearing glyph within a group of similarly shaped glyphs. This step can also be performed either manually or automatically.

For example, using the set of characters in FIGS. 3A–3D as samples, the method first identifies similarly shaped glyphs 32, 44, 52, and 66 at block 72, and then selects glyph 32 as a "basic glyph" for representing these glyphs at block 74; or identifies similarly shaped glyphs 42 and 64, and selects glyph 42 as a "basic glyph" for representing these glyphs.

Next, at block 76, the basic glyph selected at block 74 is assigned a value "i" (i=integer). The method defines the $i^{th}$ basic glyph as follows:

$G_i = f_i(\{k_j\}, \{w_m\}, L)$ i=1, ..., n (integer)

G=basic glyph shape i=basic glyph number $f_i$=algorithm for producing $i^{th}$ basic glyph shape k=key point location j=key point number in $i^{th}$ basic glyph (integer)

w=width value m=width value number in $i^{th}$ basic glyph (integer)

L=level of resolution L=0, 1, ... (integer)

Thus, each basic glyph $(G_1, \ldots, G_n)$ is defined and stored as a program for rendering the basic glyph for display. Additionally, each basic glyph $(G_1, \ldots, G_n)$ is associated with a "glyph signature" and "script sentences", as more fully described below.

Figure 5:
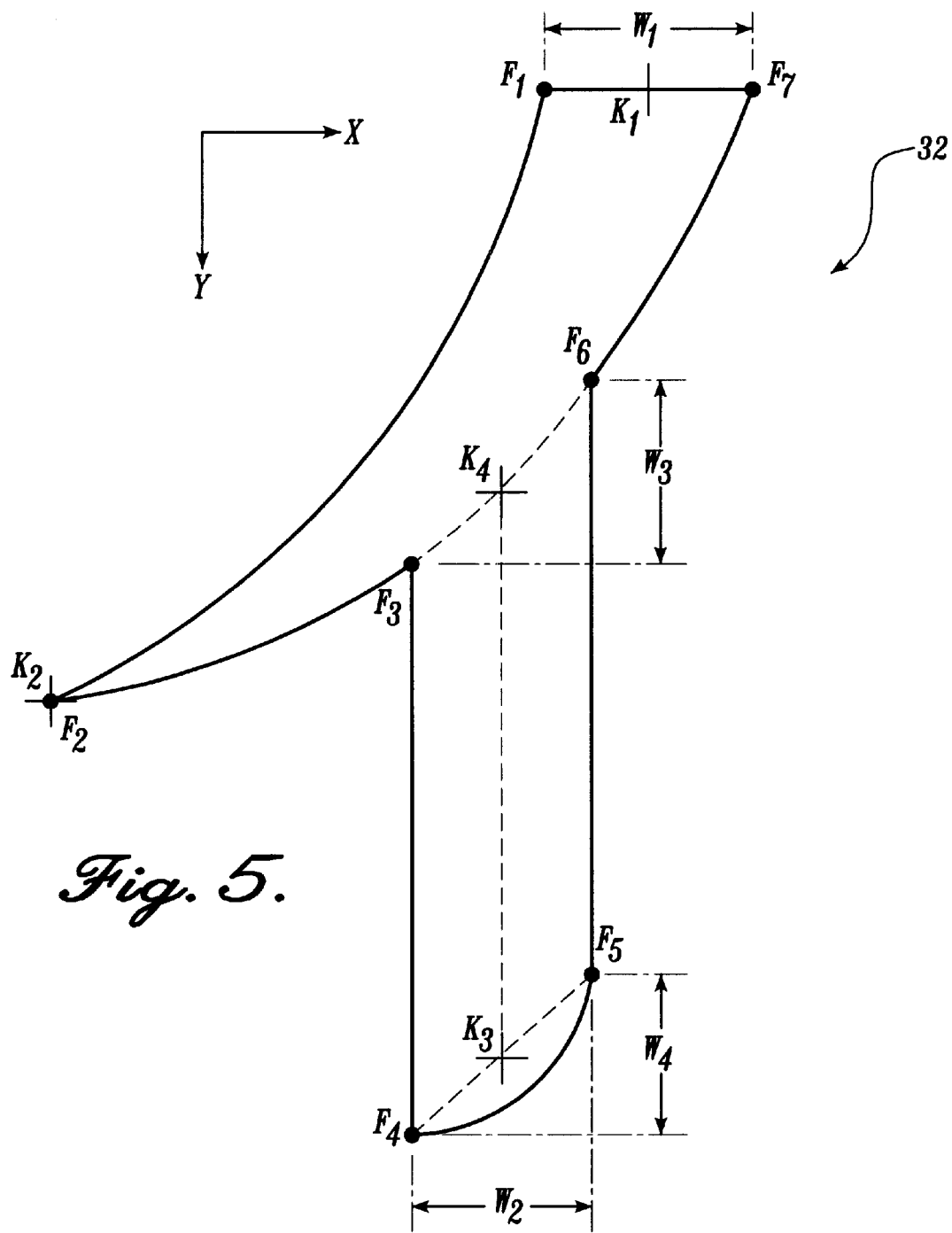
FIG. 5 depicts an exemplary glyph including key points, width values, and feature points.

For the $i^{th}$ basic glyph, first, at block 78, the method defines a plurality of feature points along the outline of the basic glyph. The feature points are generally placed on the outline at locations where the outline changes its direction or curvature. Referring additionally to FIG. 5, for example, feature points $F_1$ through $F_7$ are defined on the outline of glyph 32. Feature points may be selected manually by a font designer.

Figure 6A:
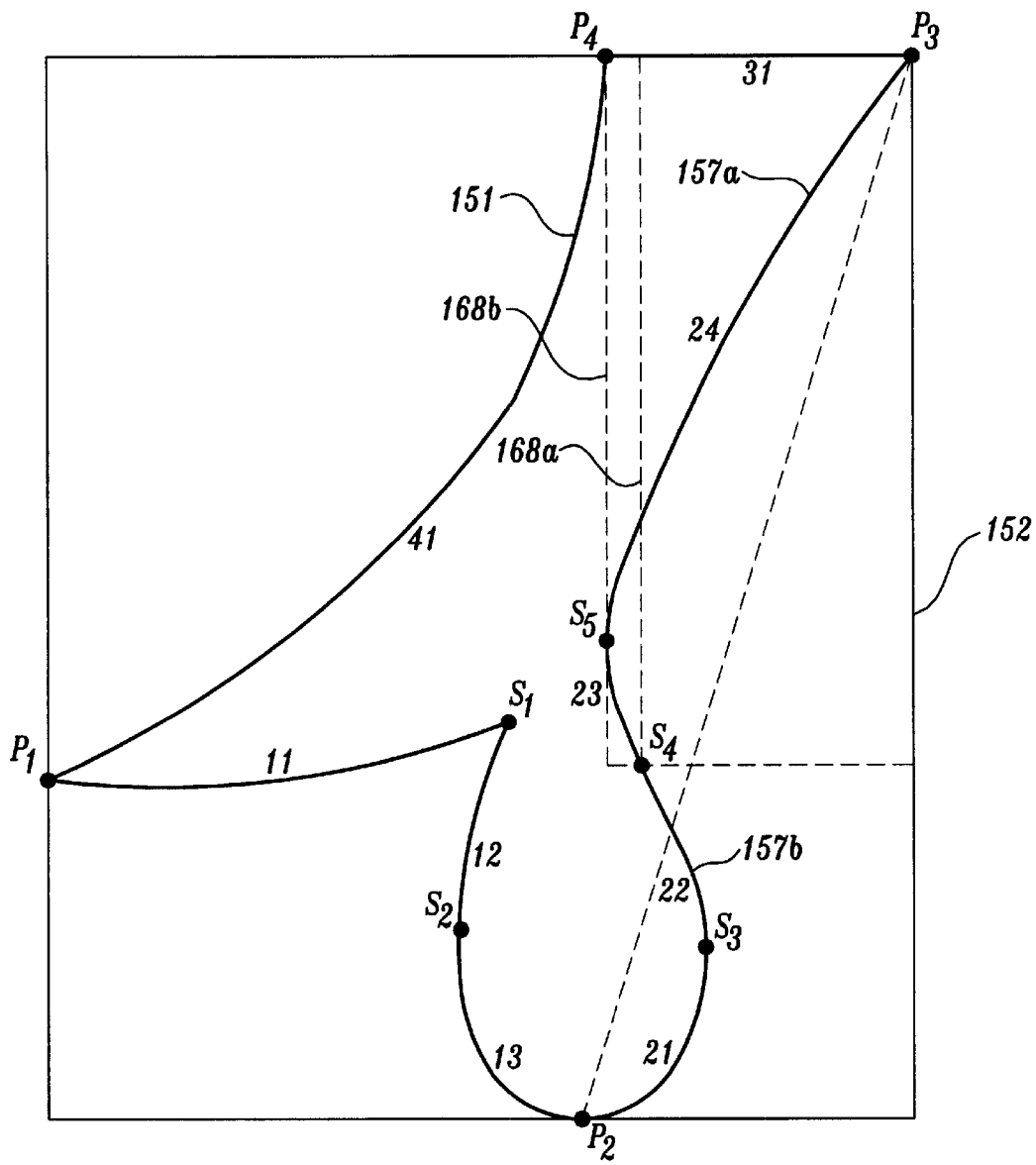
FIGS. 6A–6C illustrate a method of identifying feature points in accordance with the present invention.

Alternatively, feature points may be selected automatically. FIG. 4C illustrates steps involved in systematically identifying feature points on a glyph outline. These steps that may be automatically performed by the computer 1 may be packaged into the feature point definition program 18 (FIG. 1B) including a set of rules used for identifying feature points. At block 150, a basic glyph is fit within a minimum square. Referring additionally to FIG. 6A, for example, a glyph 151 is fit within a minimum square 152. Next, at block 153 in FIG. 4C, the method identifies four "primary" feature points at the leftmost, lowermost, rightmost, and uppermost edges of the minimum square. In FIG. 6A, four "primary" feature points $P_1$–$P_4$ are thus identified.

Next, at block 154, for each pair of adjacent "primary" feature points identified, the method determines whether all curve segments between the two points are on the same side of a line connecting the two points. See block 156. In FIG. 6A, for example, it can be seen that two curve segments 157a and 157b do not lie on the same side of the line connecting two feature points $P_2$ and $P_3$. Then, at block 158, the method identifies inflection points as feature points. (In FIG. 6A, feature point $S_4$.)

If at block 156 it is determined that all curve segments lie on the same side of a line between two feature points, or after all inflection feature points are identified at block 158, at block 160 the method determines if there are any acute-angle points. In FIG. 6A, $S_1$ constitutes an acute-angle point and, thus, is labeled as a feature point. See block 162. At this point, six feature points $(P_1, S_1, P_2, S_4, P_3$ and $P_4)$ have been identified so far in FIG. 6A.

If at block 160 it is determined that there is no acute-angle point, or after all acute-angle feature points are identified, at block 163, the method forms a minimum square for each pair of adjacent feature points heretofore identified. Next, at a decision block 164, the method determines if any curve segments lie outside the minimum square. If so, at block 166, the method expands the minimum square until the square fittedly includes all the curve segments, and identifies feature points at any of the leftmost, lowermost, rightmost, and uppermost edges of the newly expanded minimum square. In FIG. 6A, for example, a minimum square 168a is formed between two adjacent feature points $S_4$ and $P_3$. It is noted that a curve segment lies outside the minimum square 168a. Thus, the method expands the minimum square 168a to a newly expanded minimum square 168b so as to include all curve segments within that are between the two feature points. Then, the method determines a feature point $S_5$ at the leftmost edge of the expanded minimum square 168b. Feature points $S_2$ and $S_3$ are identified in the same manner.

Next, optionally at block 170, the method displays the basic glyph with all identified feature points on a display device for verification. At block 172, a font designer determines if all feature points are properly identified. As noted above, feature points should be defined on the outline of a glyph where the outline changes its direction or curvature. If not all feature points are properly identified, at block 174, the font designer visually identifies proper feature points.

Figure 6B:
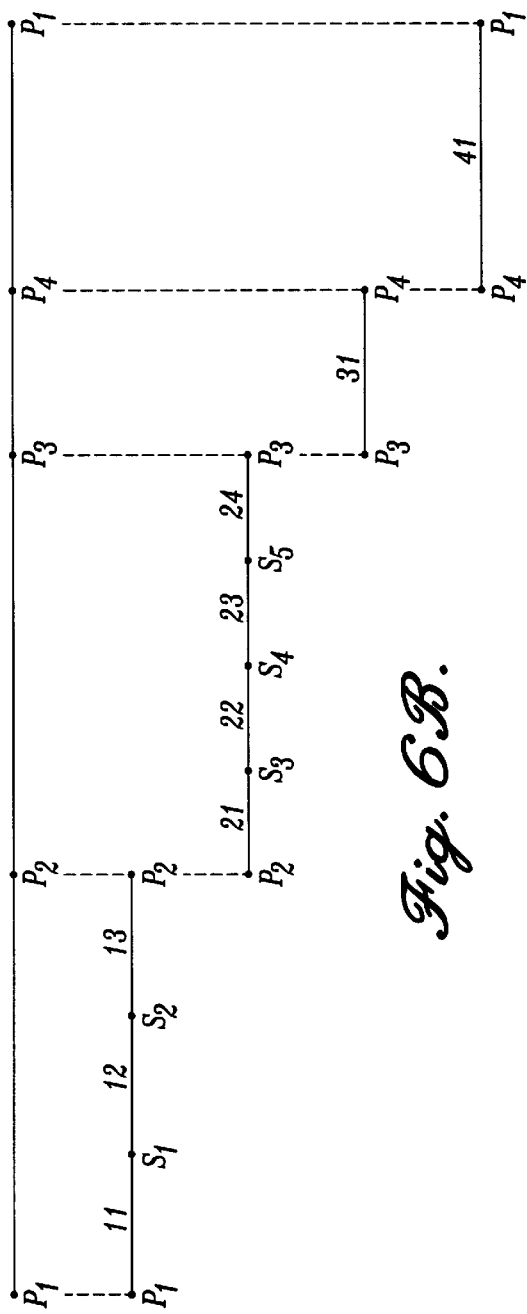
Figure 6C:
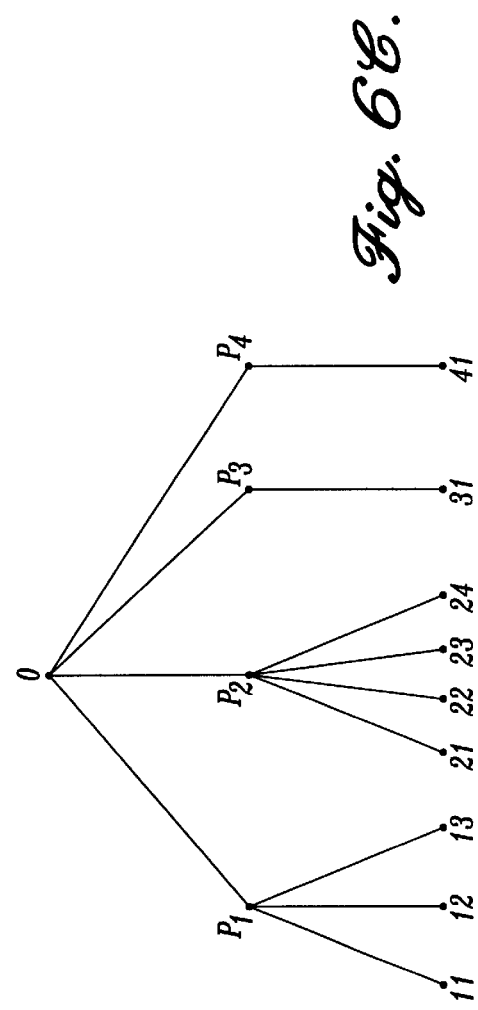

Once all feature points on a glyph outline are properly identified, the feature points are stored in order along an outline tracing path. See block 176. In FIG. 6A, for example, the method may store feature points starting with $P_1$ and tracing the glyph outline counterclockwise toward $P_4$. FIG. 6B illustrates the order of occurrence of each feature point shown in FIG. 6A, and curve segments formed between consecutive feature points. Between feature points $P_1$ and $S_1$, a curve segment "11" is formed; between feature points $S_1$ and $S_2$, a curve segment "12" is formed; and so forth. It should be noted that tracing a glyph outline may start from any feature point, and tracing may be either clockwise or counterclockwise. FIG. 6C illustrates the feature points shown in FIG. 6B in a tree structure. The structure in which the feature points of a basic glyph are arranged is termed "glyph signature". It is noted that the "glyph signature" is the same for all glyphs that one basic glyph can represent.

Returning to FIG. 4A, at block 79, the glyph signature is stored for the basic glyph being defined.

Next, at block 80, curve ratios are defined for creating curve segments between adjacent feature points. Curve ratios express how curve segments between adjacent feature points are to be rendered at various levels of resolution. In a present embodiment of the invention, the well-known Bezier curve generation algorithm is used to describe curve segments.

Figure 7C:
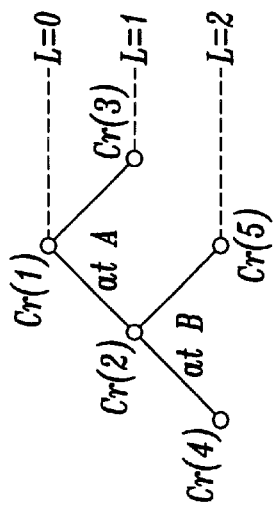
FIGS. 7A–7C illustrate a method of defining curve segments in accordance with the present invention.
Figure 7A:
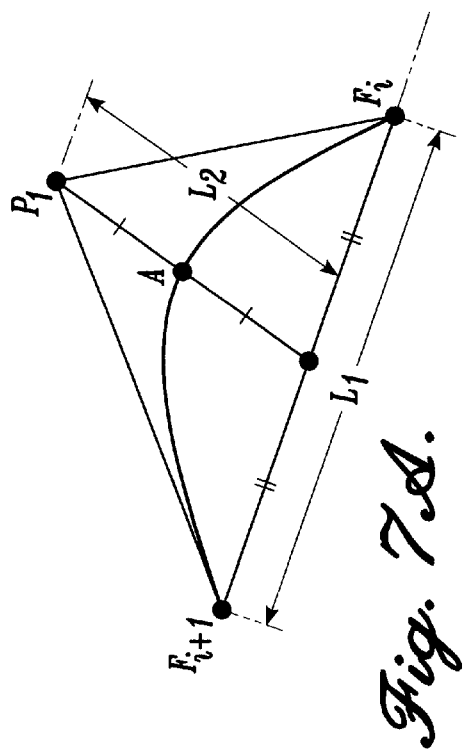

FIG. 7A illustrates a second-order Bezier curve geometry. Second-order Bezier curve generation creates a triangle between two feature points $F_i$ and $F_{i+1}$ and a movable midcontrol point $P_1$. The midcontrol point $P_1$ is placed so that the defined curve segment will most closely match the desired curve line. Then, the midcontrol point $P_1$ and the midpoints of a line $L_1$ connecting the two feature points are connected to form a line $L_2$. A curve segment is generated so as to be tangent to both lines $P_1F_i$ and $P_1F_{i+1}$ at points $F_i$ and $F_{i+1}$, respectively, and also to pass through the midpoint A of the line $L_2$. Here, a curve segment C(r), where "r" represents a particular curve ratio, can be defined as:

$$C(r)=(Cr(x),Cr(y)) \quad (1)$$

where $$Cr(x)=L_2(x)/L_1(x)$$

and $$Cr(y)=L_2(y)/L_1(y)$$

Thus, referring additionally to FIG. 7C, the curve segment shown in FIG. 7A is defined as Cr(1) (the first curve segment). This curve segment is associated with "0" level resolution (L=0), and stored in a tree-structure curve level table.

Figure 7B:
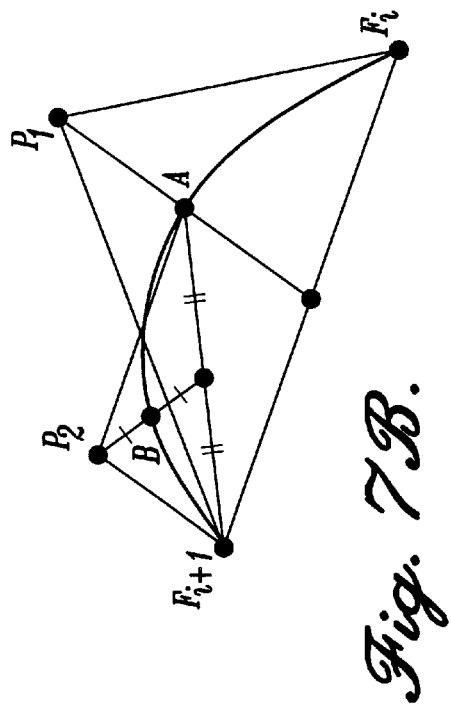

When the curve segment needs to be further defined for better quality display in a high-resolution output device, as shown in FIG. 7B, the curve segment is split further into two separate curve segments, and each curve segment may be defined using the Bezier curve technique. Specifically, in FIG. 7B, a second-order Bezier curve is generated by forming a triangle between midpoint A, a feature point $F_{i+1}$, and a movable midcontrol point $P_2$. As before, a curve segment is defined so as to be tangent to both lines $P_2A$ and $P_2F_{i+1}$ at points A and $F_{i+1}$, respectively, and to pass through the midpoint B. This curve segment is defined as Cr(2). The other curve segment between feature points A and $F_i$ is defined as Cr(3). The two finer curve segments Cr(2) and Cr(3) are then stored at level resolution "1" Referring to FIG. 7C, the curve segment Cr(2) may further be split into two curve segments Cr(4) and Cr(5) for further, finer definition, and these curve segments are stored at level resolution "2". As shown, each curve segment is associated with a particular resolution level (L=0, 1, 2).

By thus defining curve segments according to different levels of resolution, the present invention allows for high-quality output of characters regardless of the resolution level of a particular output device used. A font designer can define in greater detail a curve between two feature points by generating a greater number of curve segments between the two feature points. Greater detail is more important for generating a character for a high-resolution display, since a high-resolution display requires greater detail for characters than does a low-resolution display. For example, still referring to FIG. 7C, if resolution level L is "0" (low), only curve segment Cr(1) is retrieved. If L is "1", curve segments Cr(2) and Cr(3) are retrieved. If L is "2" (high), curve segment Cr(3), which is not further defined beyond resolution level "1", and curve segments Cr(4) and Cr(5) are retrieved.

Figure 4B:
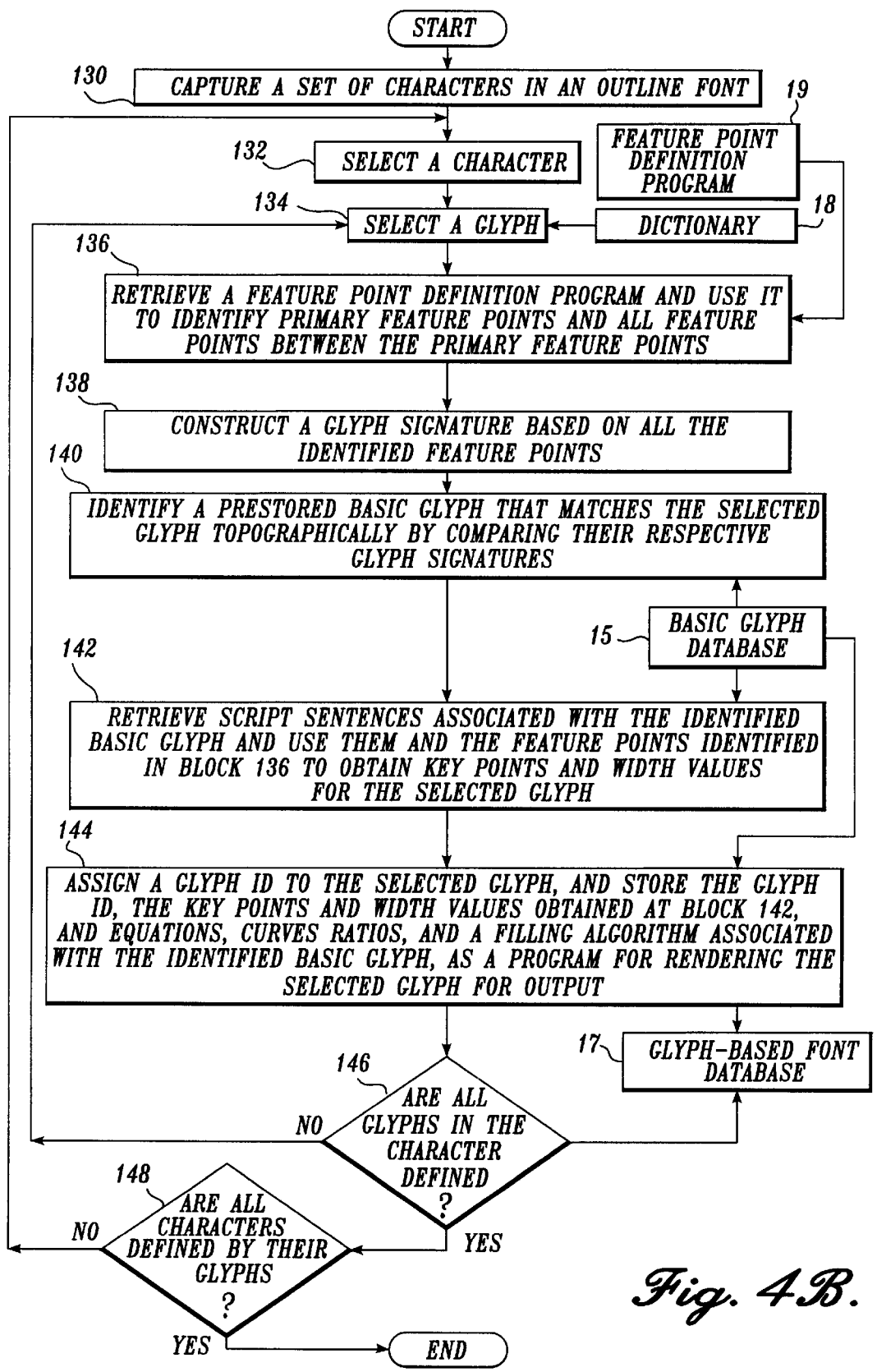
Figure 4C:
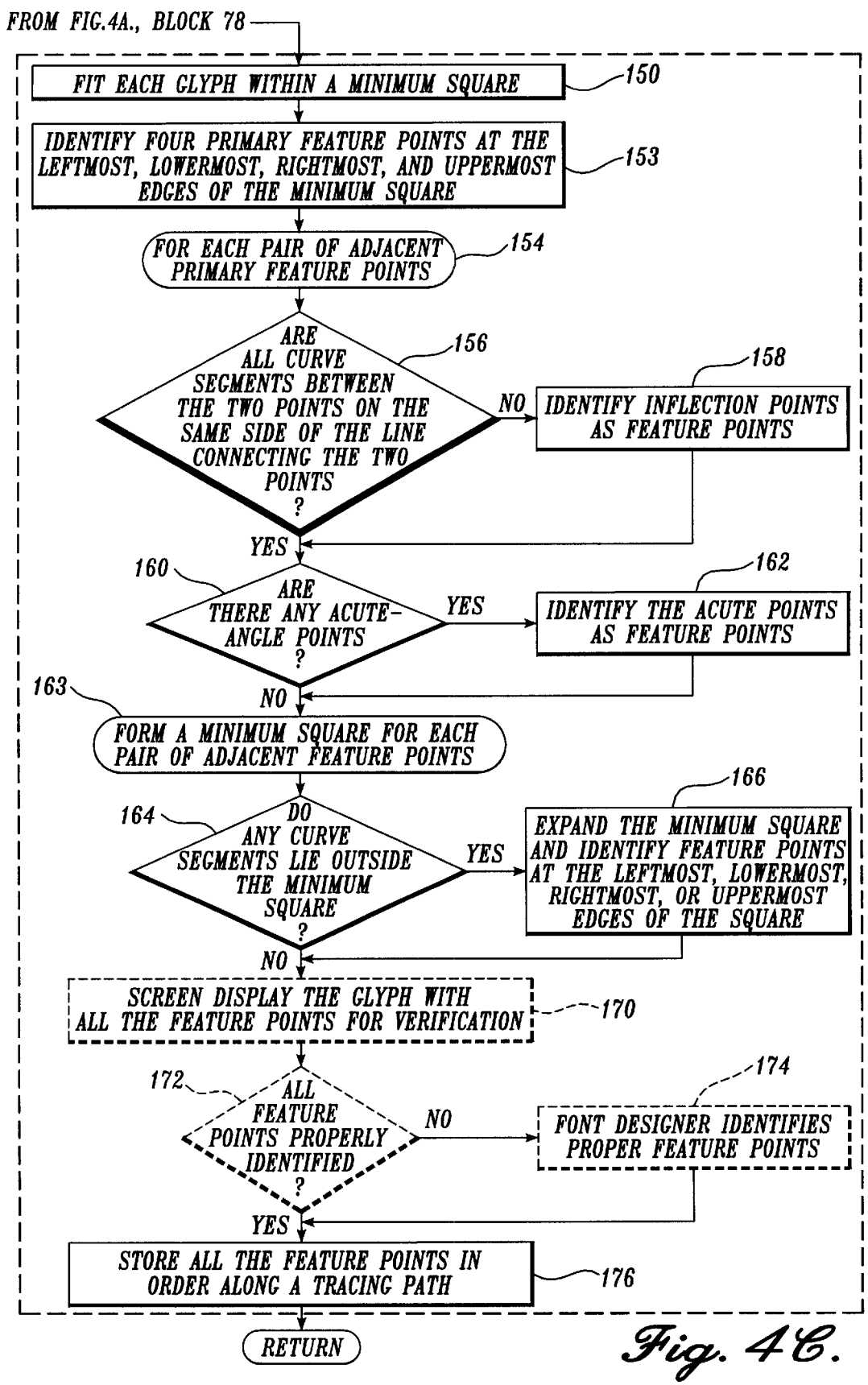
Figure 4D:
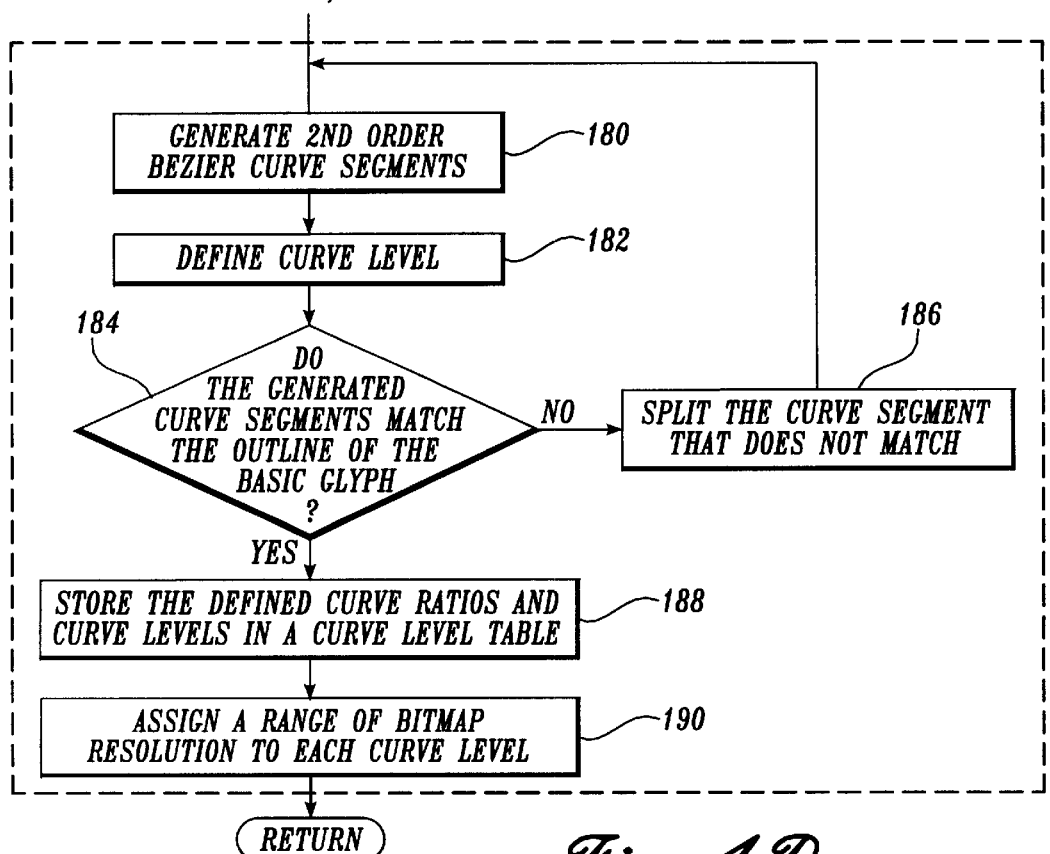

FIG. 4D illustrates the curve segment definition, as described above, in a flowchart. At block 180, the method defines one or more second-order Bezier curve segments. At block 182, the method assigns a curve level to the Bezier curve segments. Then at block 184, the method determines if all the defined curve segments match the outline of a basic glyph. If not, at block 186, the method further splits the curve segment that does not match well, further, into more curve segments, and, back at block 180, uses the second-order Bezier curve technique to define each of the split curve segments. Then, at block 182, the method assigns another curve level to the newly defined curve segments, and at block 184, determines if the newly created curve segments now match the outline of the basic glyph. This process repeats until the curve segments are determined to match the outline. Then, at block 188, the method stores all the curve ratios, together with the curve level associated therewith, in a tree-structure curve level table. At block 190, the method assigns a range of bitmap resolution to each curve level, as more fully described below.

Figure 8:
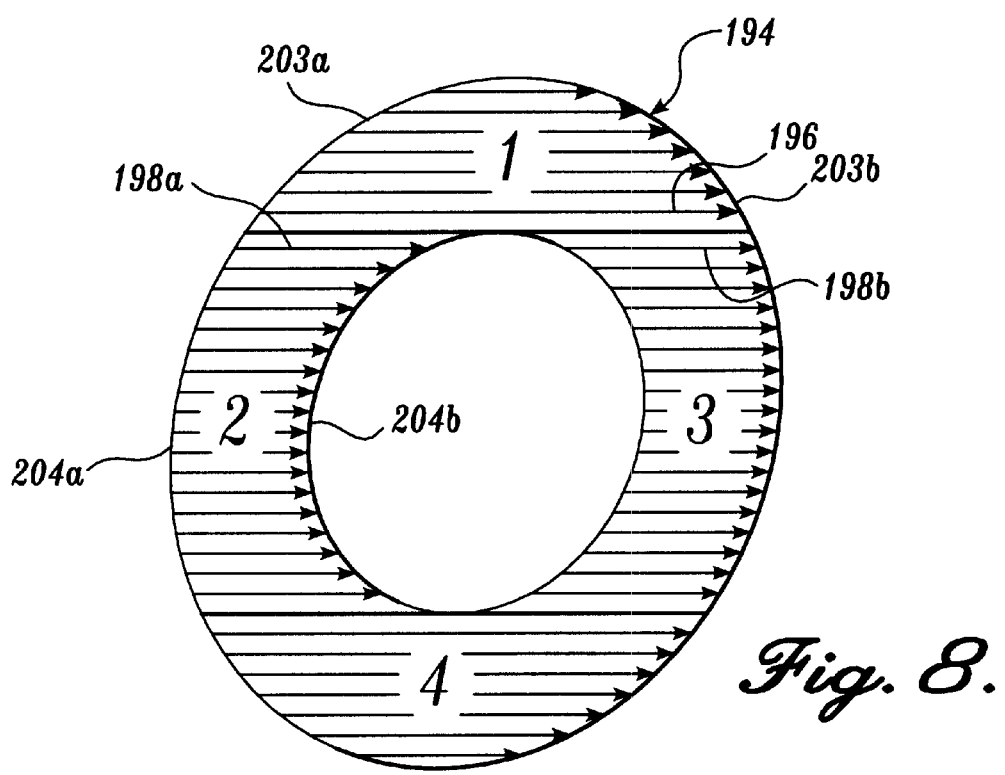
FIG. 8 illustrates a method of defining single run-length regions within an exemplary basic glyph, for filling in the outline of the basic glyph.

Once all curve segments are defined, returning back to FIG. 4A, at block 81, the basic glyph is divided into one or more single run-length regions. A single run-length region is defined as a solid area within a glyph that includes no hole within, and thus can be filled with a single scan run. Division of a basic glyph into single run-length region(s) therefore serves to make it simpler to fill within the outline shape of a basic glyph. Referring to FIG. 8, for example, a sample basic glyph shape 194 can be divided into four single run-length regions, 1 through 4. Region 1, for example, forms a single run-length region, which can be filled in by a single scan run, as indicated by an arrow 196. The midsection of the glyph 194 is divided into two regions 2 and 3, since two separate scan runs, as indicated by arrows 198a and 198b, are required to fill in the entire midsection. Then, for each of the single run-length regions thus created, the method defines a filling algorithm.

Figure 4E:
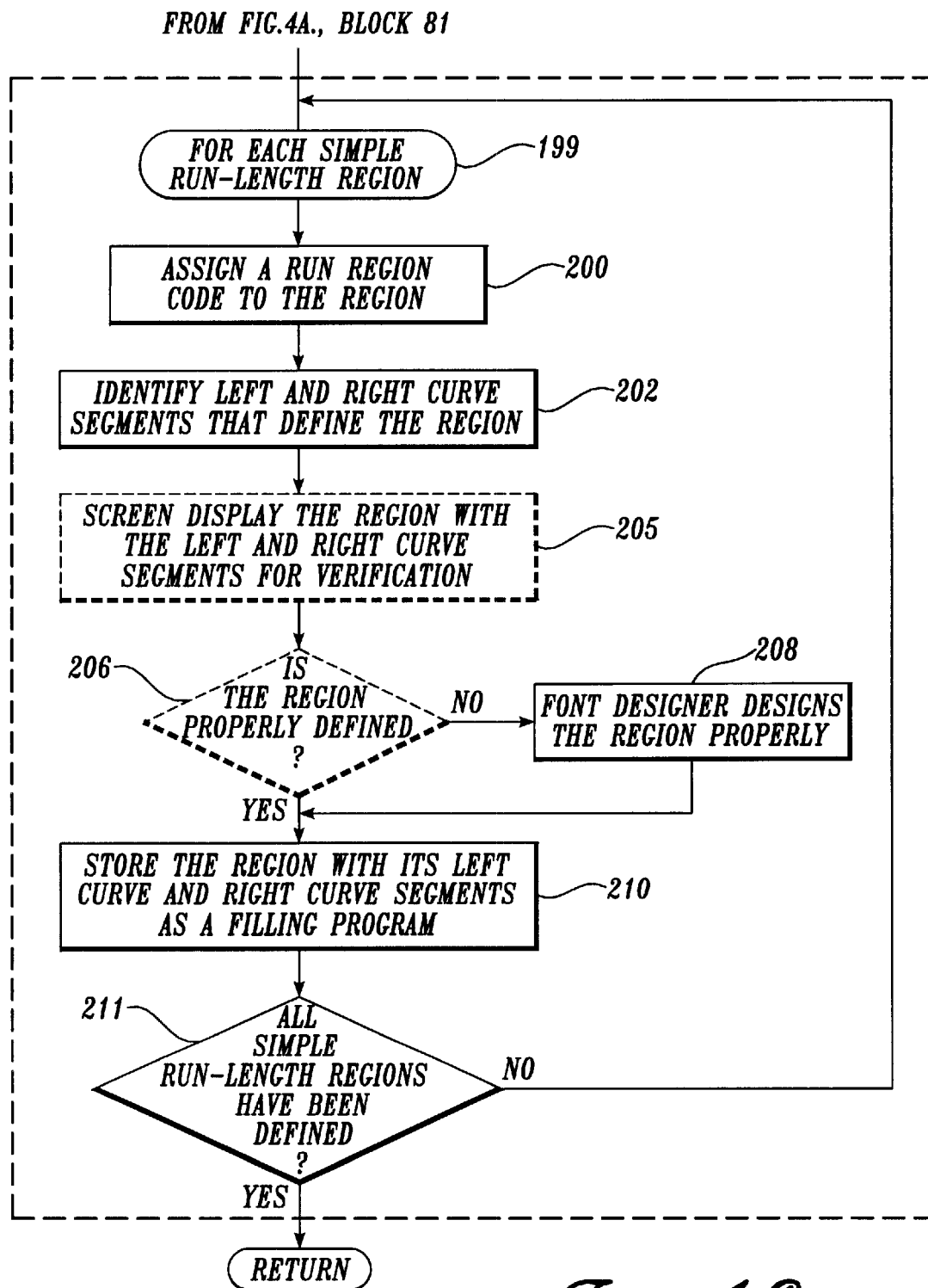

Referring to FIG. 4E, at block 199, to define the filling algorithm for each of the single run-length regions, the method first assigns a run-region code to the region. See block 200. At block 202, the method identifies left and right curve segments that define the region. In FIG. 8, for example, the region "1" is defined by {left curve segment= 203a, right curve segment=203b}, where the curves 203a and 203b have been previously defined at block 80 of FIG. 4A. Similarly, the region "2" is defined by {left curve segment=204a, right curve segment=204b}, and so forth. Thus structured, filling within the outline of the glyph 194 upon display becomes simple, since filling can take place at each node (single run-length region) separately, in an orderly fashion.

Next, optionally at block 205, the method displays the single-run length region with its left and right curve segments on a screen for a font designer's verification. At block 206, a font designer determines if the region is properly defined. If not, at block 208, the font designer manually defines the region properly. If, on the other hand, the region is determined to be properly defined, then at block 210, the method stores the region with its left and right curve segments as a filling program. The method then determines if all single run-length regions have been defined at block 211. If not, the method returns to block 199, and defines a filling algorithm for another single run-length region. If it is determined that all single run-length regions have been defined at block 211, the method returns to block 81 of FIG. 4A.

Next, at block 82 of FIG. 4A, the method defines and stores "key points" of the $i^{th}$ basic glyph. Referring to FIG. 5, key points $K_1$ through $K_4$ are defined. The key points are defined in a position relative to the topographic layout of the basic glyph, and based on a number of observed features of the similarly shaped glyphs that the basic glyph represents. The key points may be defined by a font designer manually, or may be defined automatically by an image analysis software based on a predefined set of rules. Generally, key points are placed at the beginning and terminus of a basic glyph and at any location where a basic glyph changes direction abruptly. Key points are positioned to allow elongating, stretching, or warping the basic glyph's ends or other sections in order to modify the shape of the basic stroke to match any of the set of similarly shaped glyphs that the basic glyph represents. In other words, key points are placed in, on, or outside a basic glyph so that the shape of the basic glyph can be freely manipulated by moving the key points. The minimum number of key points for a glyph is two.

Also at block 82, a certain key point that needs to be displayed at a particular location with respect to the bitmap cell, upon which the key point falls, may be labeled with "hint information". Hint information is labeled typically when a basic glyph is observed in a low-resolution character space. Hint information forces each labeled key point to be at a particular location with respect to the bitmap cell upon which the key point falls, so as to avoid jamming of a displayed glyph or to maintain symmetry of the glyph upon display.

Figure 9A:
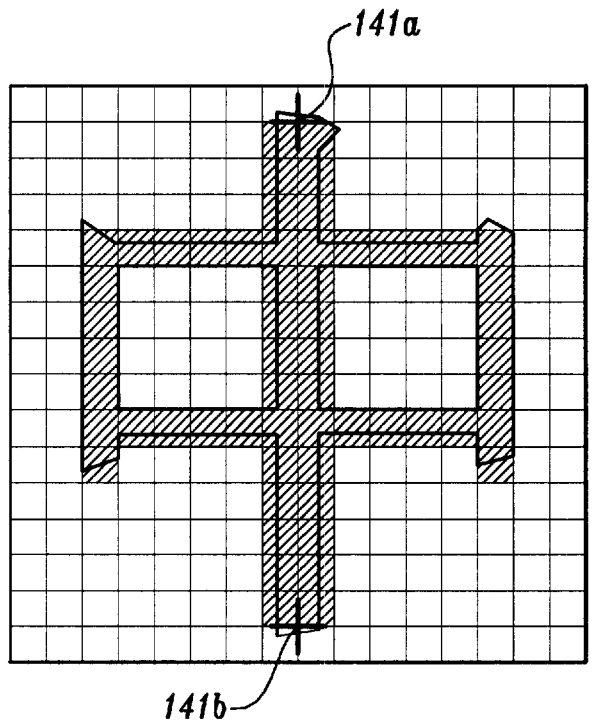
FIGS. 9A and 9B are illustrations of a character on display with unlabeled and labeled key points, respectively.
Figure 9B:
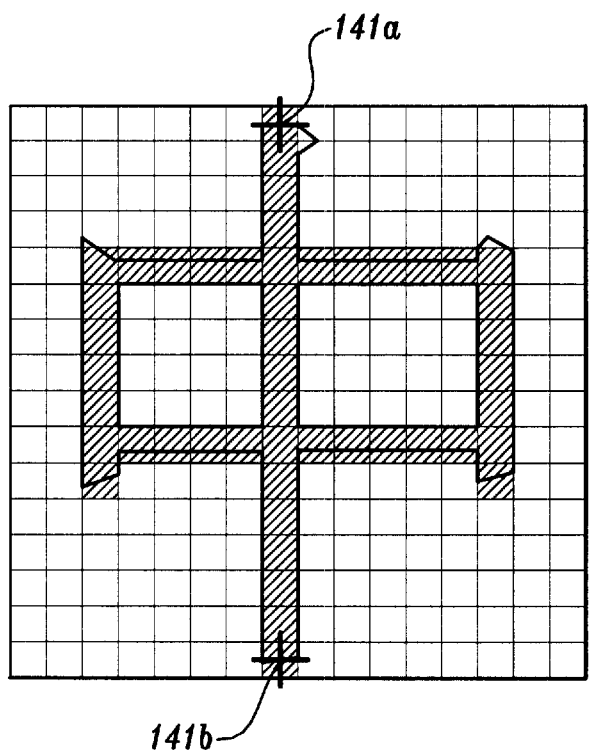

FIGS. 9A and 9B illustrate the contrast of unlabeled and labeled key points. In FIGS. 9A and 9B, a glyph outline is shown in a solid line, and screen bitmap cells that are activated by the glyph outline for display are shown as crosshatched area. Typically, a bitmap cell is activated when at least 50% of the bitmap cell area is covered by a glyph outline. In FIG. 9A, key points 141*a* and 141*b* are unlabeled. As a result, the vertical middle stroke of a displayed glyph activates two columns of bitmap cells because its outline covers at least 50% of the bitmap cells of both of these columns. This is not desirable since the rest of the displayed glyph is shown with a single-column or single-row width.

In contrast, as shown in FIG. 9B, when key points 141*a* and 141*b* are labeled with hint information so as to be centered within a display bitmap cell, the key points are moved to the center of the bitmap cells and, thus, the vertical middle stroke of the displayed glyph activates only one column of display bitmap cells.

It should be understood that centering a key point within a bitmap cell is only one example of use of hint information. Hint information may be used, for example, for forcing a key point to fall on the edge of a bitmap cell, or at any other position with respect to a bitmap cell.

The font designer can designate the resolution level at which hint information will be used during display processing of the stored glyphs. This may be preferable since hinting may not be required when the stored glyphs are displayed on a high-resolution output device. For example, if the font designer designates Level 1 as a hint information active level, all levels below (lower resolution levels) and including Level 1 will exhibit active hinting of key points that are labeled with hint information.

Next, at block 83, the method designates and stores at least one width value for the basic glyph. In FIG. 5, width values $W_1$ through $W_4$ are defined. Again, where to assign width values within a basic glyph can be determined manually by a font designer, or automatically by image analysis software according to a predefined set of rules. Width values are defined based on observed widths of similarly shaped glyphs that a basic glyph represents. Similarly to key points, width values should be defined so that one may manipulate the shape of the basic glyph to match any of the similarly shaped glyphs that the basic glyph represents by changing the width values (i.e., by decreasing or increasing the width values).

Once the key points and width values are defined, at block 84, the method obtains equations that obtain the feature points (defined at block 78) from the key points and width values (defined at blocks 82 and 83, respectively). Referring to FIG. 5, letting $F=(|F|_x, |F|_y)$ represent the X-Y location of a feature point; $K=(|K|_x, |K|_y)$ represent the X-Y location of a key point; and W represent a width value, the feature points ($F_1$–$F_7$) can be obtained using the following equations:

$$|F_1|_x = |K_1|_x - \tfrac{1}{2}W_1; \quad |F_1|_y = |K_1|_y \tag{2}$$

$$|F_2|_x = |K_2|_x; \quad |F_2|_y = |K_2|_y \tag{3}$$

$$|F_3|_x = |K_4|_x - \tfrac{1}{2}W_2; \quad |F_3|_y = |K_4|_y + \tfrac{1}{2}W_3 \tag{4}$$

$$|F_4|_x = |K_3|_x - \tfrac{1}{2}W_2; \quad |F_4|_y = |K_3|_y + \tfrac{2}{3}W_4 \tag{5}$$

$$|F_5|_x = |K_4|_x + \tfrac{1}{2}W_2; \quad |F_5|_y = |K_3|_y - \tfrac{1}{3}W_4 \tag{6}$$

$$|F_6|_x = |K_4|_x + \tfrac{1}{2}W_2; \quad |F_6|_y = |K_4|_y - \tfrac{1}{2}W_3 \tag{7}$$

$$|F_7|_x = |K_1|_x + \tfrac{1}{2}W_1; \quad |F_7|_y = |K_1|_y \tag{8}$$

At block 86, the method obtains "script sentences" that are functional opposites of the equations described above, i.e., that obtain the key points and width values from the feature points. Continuing the example of FIG. 5, the key points ($K_1$–$K_4$) and width values ($W_1$–$W_4$) can be obtained using the following script sentences:

$$|K_1|_x = \tfrac{1}{2}(|F_1|_x + |F_7|_x); \quad |K_1|_y = |F_1|_y \text{ or } |F_7|_y \tag{9}$$

$$|K_2|_x = |F_2|_x; \quad |K_2|_y = |F_2|_y \tag{10}$$

$$|K_3|_x = \tfrac{1}{2}(|F_4|_x + |F_5|_x); \quad |K_3|_y = |F_4|_y - \tfrac{2}{3}(|F_4|_y - |F_5|_y) \tag{11}$$

$$K_4 = \text{Intersection}(\text{V-Line}(|K_3|_x), \text{Line}(F_3, F_6)) \tag{12}$$

$$W_1 = |F_7|_x - |F_1|_x \tag{13}$$

$$W_2 = |F_5|_x - |F_4|_x \tag{14}$$

$$W_3 = |F_3|_y - |F_6|_y \tag{15}$$

$$W_4 = |F_4|_y - |F_5|_y \tag{16}$$

where V-Line is a vertical line that passes the point within the parentheses (e.g., $|K_3|_x$ in equation 12), Line is a segment connecting the two points within the parentheses, and Intersection is a point where the two lines within the parentheses intersect.

Once all the basic glyphs have been thus completely defined, at block 88, the method stores in the basic glyph database 15 (FIG. 1B) the $i^{th}$ basic glyph identification (ID), the key points, the width values, the equations for obtaining feature points from the key points and width values, the curve ratios stored in a curve level table, and the filling algorithm as a program for rendering that basic glyph for output ($G_i$: i=1, . . . , n). Further, in association with each basic glyph rendering program ($G_i$), the basic glyph's "glyph signature" (stored at block 79 of FIG. 4A) and "script sentences" (defined at block 86) are stored in the basic glyph database 15.

Next, at block 90, the method determines whether all basic glyphs have been defined and stored. In other words, it is determined if all glyphs in the set of characters have been represented by at least one basic glyph. If not, the method returns to block 72, and defines another basic glyph in the same manner as described.

Once all basic glyphs have been thus defined, the basic glyph database includes a set of programs for rendering all basic glyphs, wherein each basic glyph rendering program is associated with a particular glyph signature and script sentences for that basic glyph. The basic glyph database including a set of predefined basic glyphs may now be used in a method of automatically converting an outline font into a glyph-based font in accordance with the present invention, as described below.

FIG. 4B illustrates the steps generally performed by the conversion program 16 of FIG. 1B, for automatically converting an outline font into a glyph-based font using a set of predefined basic glyphs stored in the basic glyph database 15. At block 130, first, a set of outline font characters, each being defined as a collection of outlining lines and curves, is captured into the computer 1. The outline font characters may be loaded into the computer's system memory 11 in their entirety prior to processing, or may be loaded one portion at a time and processed in blocks. At block 132, a character is selected from the captured set of characters. At block 134, a glyph is selected within the selected character, preferably in reference to the dictionary 18 (FIG. 1B). The dictionary 18 stores information about various outline fonts to be converted into a glyph-based font. Specifically, the dictionary 18 preferably stores character codes of all characters included in a certain font type of a certain font manufacturer, and glyph numbers of all glyphs that are located in specific space within each character. By referring to such a dictionary, the conversion program 16 may determine, for example, how many glyphs are included in each outline font character. It is noted, though, that the present method is possible without a dictionary, for example, by simply assuming that each character contains the same number of glyphs.

For the selected glyph, at block 136, the feature point definition program 19 (FIG. 1B) described above in reference to FIG. 4C is retrieved, and primary feature points and all feature points between the primary feature points are identified along the glyph outline according to the program. As discussed above, the feature point definition program 19 includes a set of rules that the computer can follow to automatically identify feature points on the outline of a glyph. In this regard, it is noted that the optional user intervention steps identified as steps 170, 172, and 174 in FIG. 4C are preferably omitted so as to fully automate the feature point identification process.

Next, at block 138, a glyph signature of the selected glyph is constructed based on all the feature points identified in block 136.

Thereafter, at block 140, the basic glyph database 15 is searched for a basic glyph that topographically matches the selected glyph. Preferably, a basic glyph whose glyph signature matches the glyph signature of the selected glyph is selected. As noted above, all glyphs that one basic glyph can represent share the same glyph signature. Thus, any selected glyph should have at least one basic glyph whose glyph signature matches the glyph signature of its own.

Once a matching basic glyph is identified, at block 142, the script sentences associated with the matching basic glyph are retrieved. The script sentences are used to obtain key points and width values of the selected glyph based on the feature points of the selected glyph identified in block 136. At this point, because the feature points of the selected glyph may be positioned slightly differently from the feature points of the matching basic glyph (though their glyph signatures match), the key points and width values of the selected glyph obtained by the script sentences of the matching basic glyph may also be slightly different from the key points and width values of the matching basic glyph. It is noted, though, that if any key point of a basic glyph is labeled with hint information, as described above in reference to FIGS. 9A and 9B, the script sentence for obtaining that key point is adapted to automatically label any key point that it calculates. Therefore, if a basic glyph includes key points labeled with hint information, such hint information is automatically transferred to any glyph whose key points are calculated using the script sentences of that basic glyph.

Next, at block 144, a glyph ID is assigned to the selected glyph. The glyph ID, the key points and width values of the selected glyph identified at block 142, and the equations, curve ratios, and a filling algorithm of the matching basic glyph are all stored as a program for rendering the selected glyph for output. At block 146, it is determined whether all glyphs within the selected outline character are thus defined. If not, the automatic glyph definition process described above is repeated for other undefined glyphs within the selected character. When all glyphs within the selected character are defined, the selected character, now defined as a collection of glyphs in accordance with the present invention, is stored in the glyph-based font database 17 (FIG. 1B). At block 148, it is determined whether all outline characters that were captured have been redefined based on their glyphs, and if not, the process of automatically defining a character is repeated for undefined characters. When all characters are defined based on their glyphs, the conversion process ends.

Once all characters have been thus redefined based on their glyphs, the glyph-based font database 17 stores all characters, wherein each character is stored as a set of programs for rendering glyphs included in the character for display.

Figure 4F:
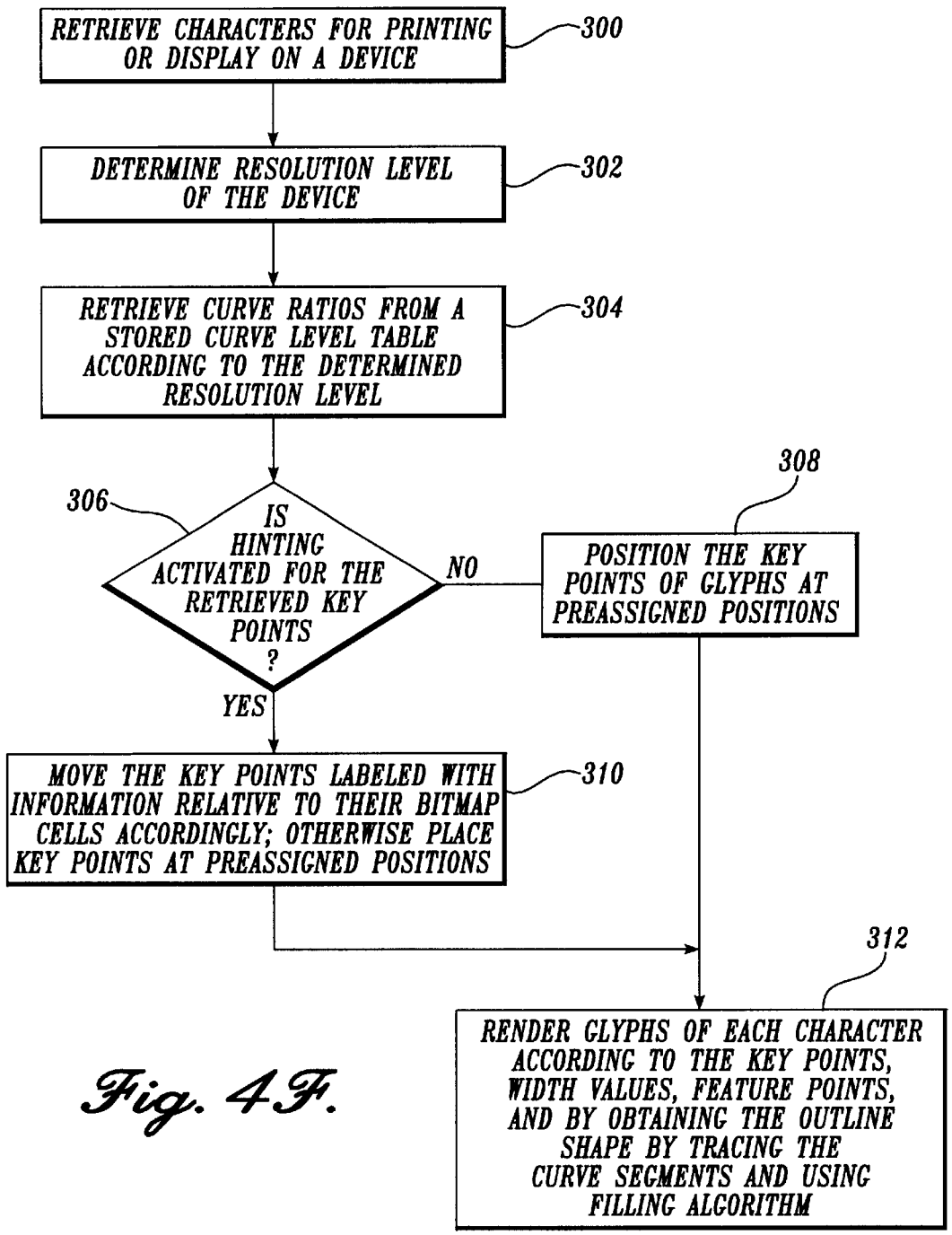
FIG. 4F is a flowchart depicting a method of rendering a glyph-based font for display independent of resolution.

FIG. 4F illustrates a method of rendering for display those glyph-based font characters now stored in the glyph-based font database 17. The steps shown in FIG. 4F are performed by the glyph-based font rendering program 20 in the computer 1 (FIG. 1B), for high-quality output (display, printing, etc.) at either low- or high-resolution level. At block 300, the method retrieves characters for display or printing by selecting the characters in an application program, such as a word processing program. At block 302, the method determines the resolution level of the display or printing device. At block 304, curve ratios are retrieved for each of the glyphs forming each character from a stored curve level table according to the determined resolution level of the display or printing device.

At a decision block 306, it is determined if hinting is activated for the retrieved key points included in each glyph at the particular resolution level of the display or printing device. If hinting is not activated, at block 308, all key points of the glyphs of the retrieved characters are placed according to their preassigned positions. If hinting is activated, at block 310, key points labeled with hint information are moved and fixed to the particular locations with respect to the bitmap cells upon which they fall, and nonlabeled key points are fixed to their preassigned positions.

Finally, at block 312, the glyphs are rendered according to the determined key point positions and stored width values. Feature points are calculated according to the key points and width values using equations (defined at block 84 of FIG. 4A). Curve segments between the calculated feature points are obtained according to the curve ratios retrieved from a curve level table. The curve ratios are retrieved according to the determined resolution level of the particular output device. For example, curve ratios that define curves in greater detail are retrieved for a high-resolution output device, and curve ratios that define curves in less detail are retrieved for a low-resolution output device, to thereby allow for high-quality output regardless of the resolution level of a particular output device used. The curve segments are then traced to form the outline shape of each glyph.

Finally, a filling algorithm associated with each glyph fills the area within the glyph outline. Since each glyph is divided into one or more single run-length regions, as discussed above, filling within the glyph outline involves filling each of the single run-length regions separately. The filling algorithm activates a bitmap cell according to predefined criteria. For example, a bitmap cell may be activated (filled) if at least 50% of the bitmap cell is covered by the area within the calculated glyph outline or if the center of a bitmap cell is within the calculated glyph outline.

The definition of basic glyphs in accordance with the present invention may be practiced using a graphical user interface (GUI) CAD tool. The following describes the operation of such a GUI tool, for use in a Windows®-based operating system. It should be understood that a GUI tool suitable for use in the present invention can be implemented in various other types of operating systems. It is also noted that the method performed by a CAD tool in the following description can be performed automatically using image analysis techniques.

Figure 10:
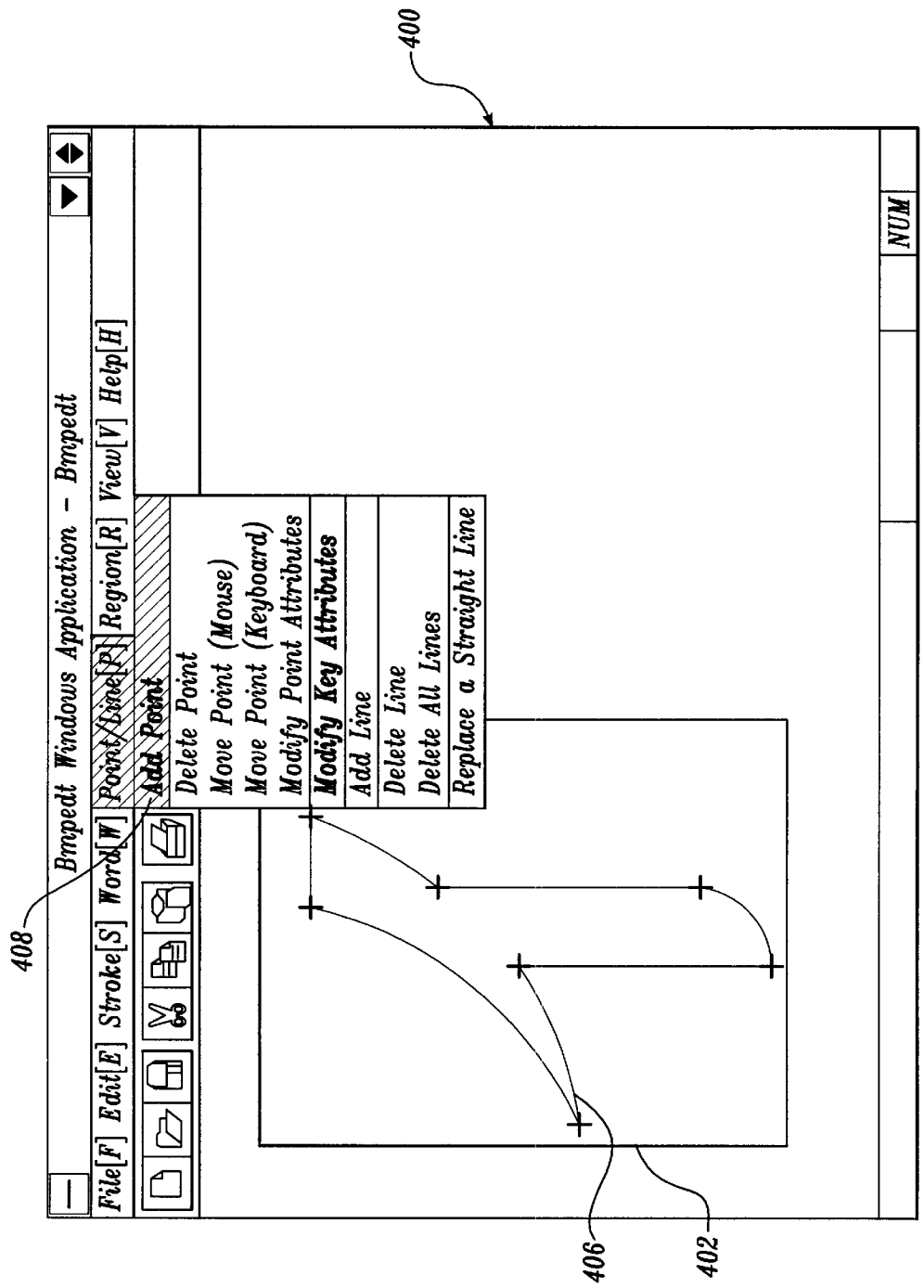
FIG. 10 is a screen shot of a designer CAD tool that may be used for defining feature points of a basic glyph.

FIG. 10 illustrates the method of manually defining feature points in a basic glyph using a GUI tool. In FIG. 10, a GUI CAD tool 400 includes a title, main menu, buttons, and two-dimensional display area 402 in accordance with a typical Windows®-based application. In the display area 402, a basic glyph 406 is displayed. To define a feature point, a font designer selects "Add Point" command 408 from the CAD tool menu, and places a cursor on the basic glyph's outline where the designer wishes to place a feature point. By clicking a mouse, for example, the feature point can be defined. In the display area 402, defined feature points are identified as "+" marks.

Figure 11A:
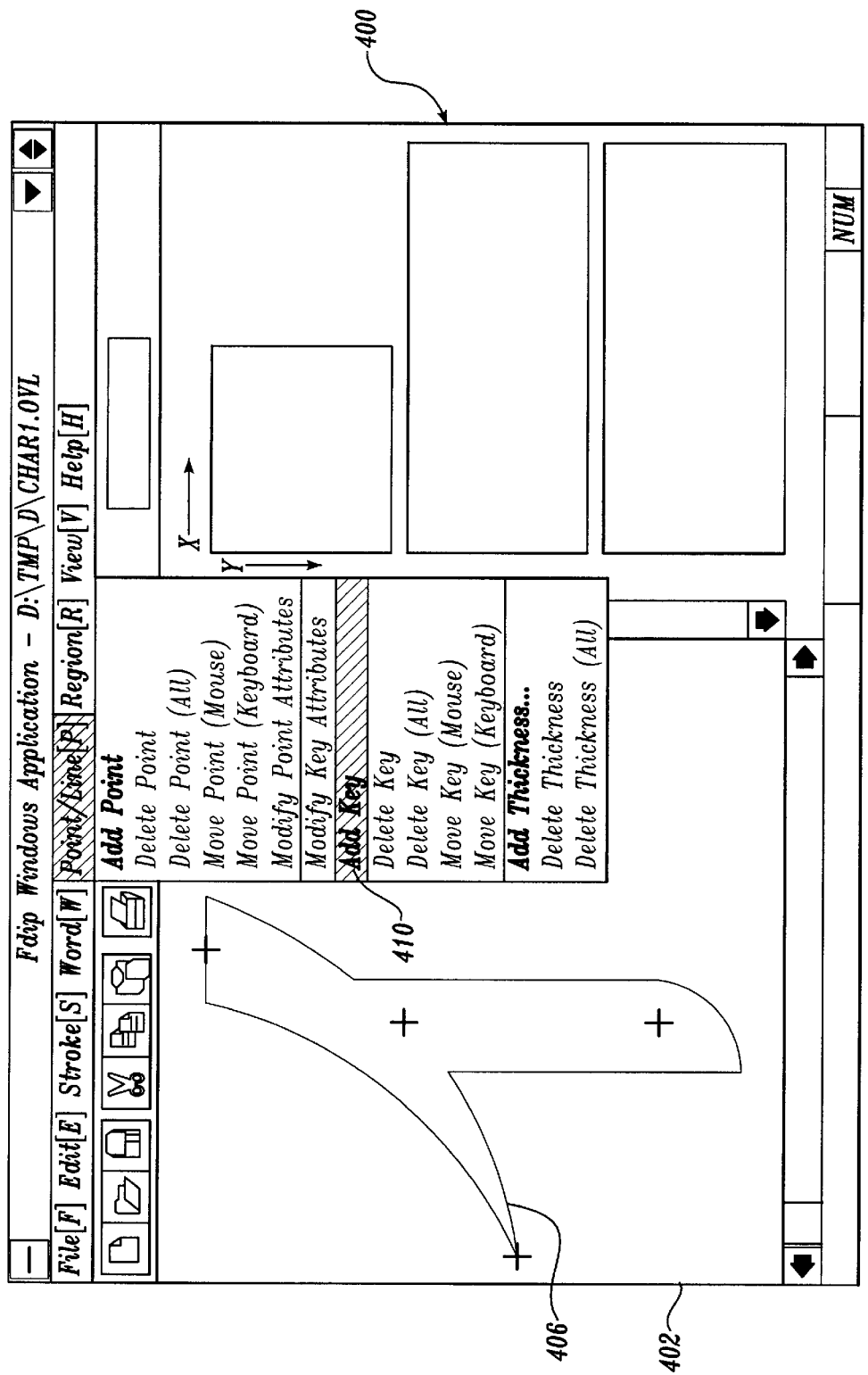
FIGS. 11A–11C are screen shots of a designer CAD tool used for defining key points and width values of a basic glyph.
Figure 11B:
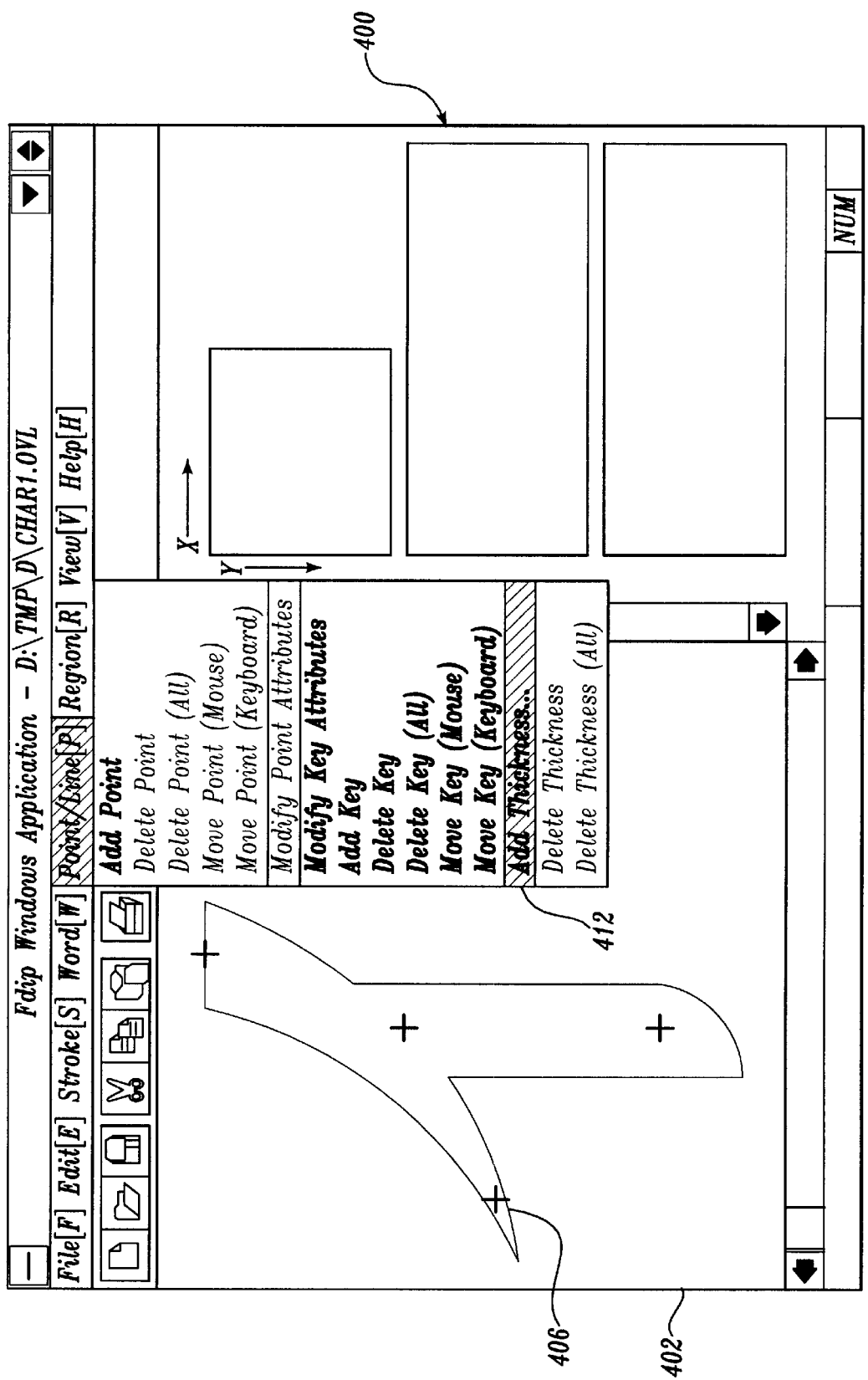
Figure 11C:
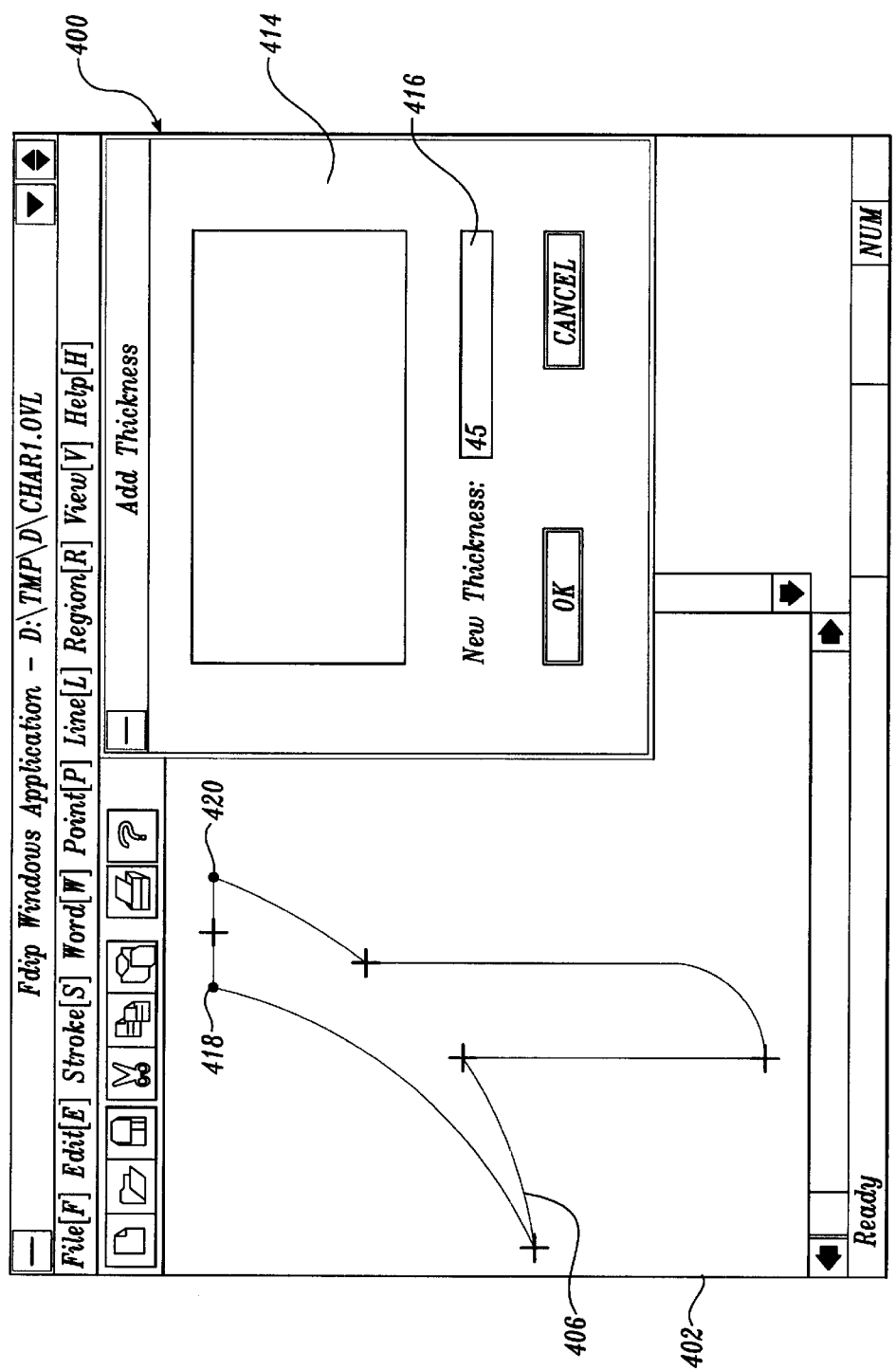

FIGS. 11A–11C illustrate the method of defining key points and width values for a basic glyph on the CAD tool. In FIG. 11A, the font designer selects "Add Key" command 410 from the CAD tool menu, and places a cursor where the designer wishes to place a key point. By clicking a mouse, for example, the key point can be defined. The defined key points are identified by "+" marks.

To define a width value, in FIG. 11B, the font designer selects "Add Thickness" command 412 from the menu to retrieve an "Add Thickness" window 414, as shown in FIG. 11C. Then, in the display area 402, the font designer moves a cursor to designate first and second points 418 and 420, between which the designer wishes to define a width value. The CAD tool 400 measures the straight-line distance between the first and second points 418 and 420 and displays the distance as a thickness (width) value in a "New Thickness" box 416 within the "Add Thickness" window 414.

Figure 12A:
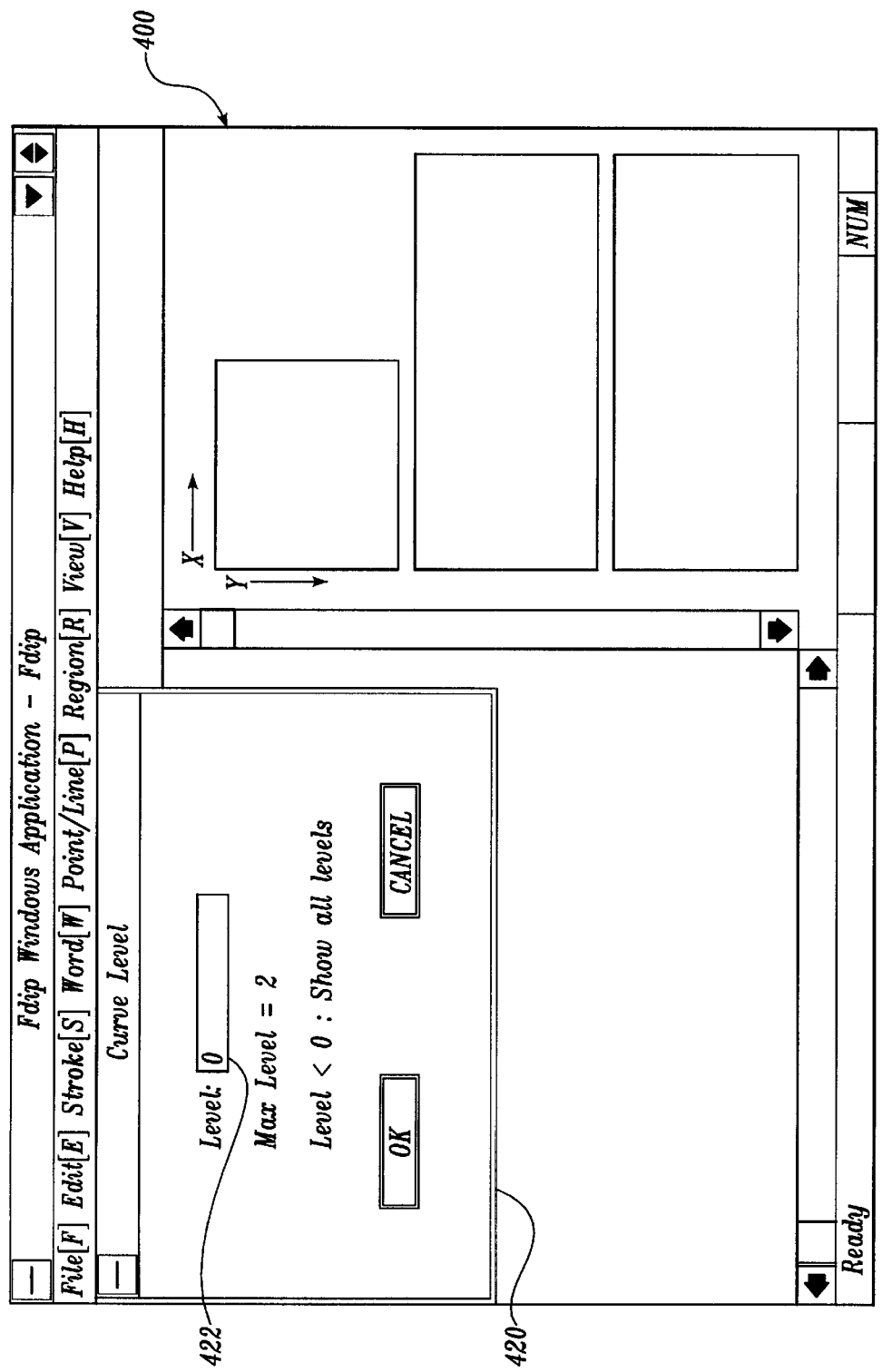
FIGS. 12A–12E are screen shots of a designer CAD tool used for defining curve ratios at various resolution levels.
Figure 12B:
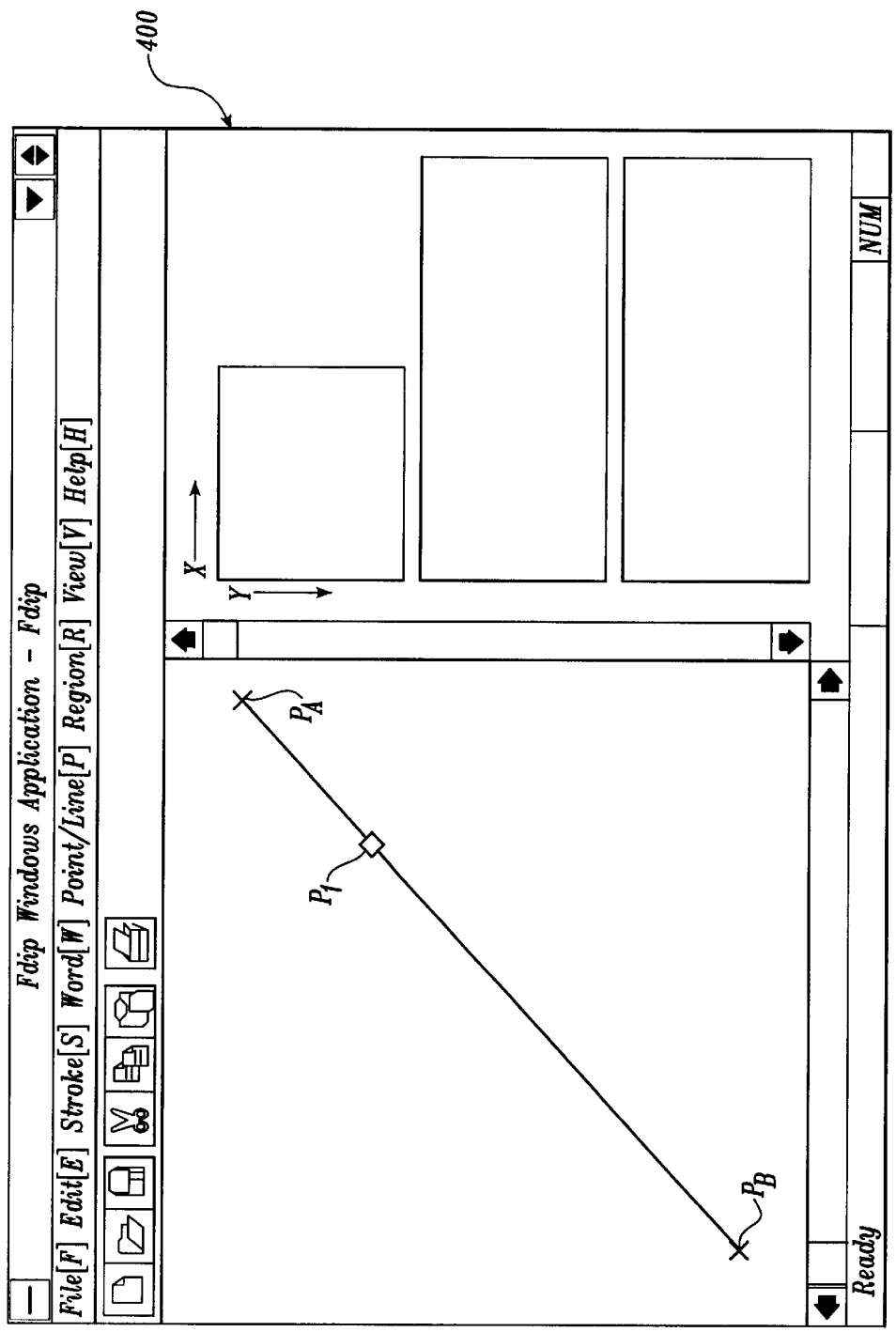

FIGS. 12A–12E illustrate how a font designer can define curve segments between feature points on a basic glyph. As shown in FIG. 12A, the font designer begins the process by first retrieving a "Curve Level" window 420 and enters curve level "0" into a curve level code block 422. Then, in FIG. 12B, the font designer generates a curve segment between two feature points $P_A$ and $P_B$ with a single midcontrol point $P_1$. As shown, no curvature is created here, since midcontrol point $P_1$ is placed on the line connecting two consecutive feature points. Thus, the "curve segment" between the two feature points $P_A$ and $P_B$ at curve level "0" is a straight line including no curvature.

Figure 12C:
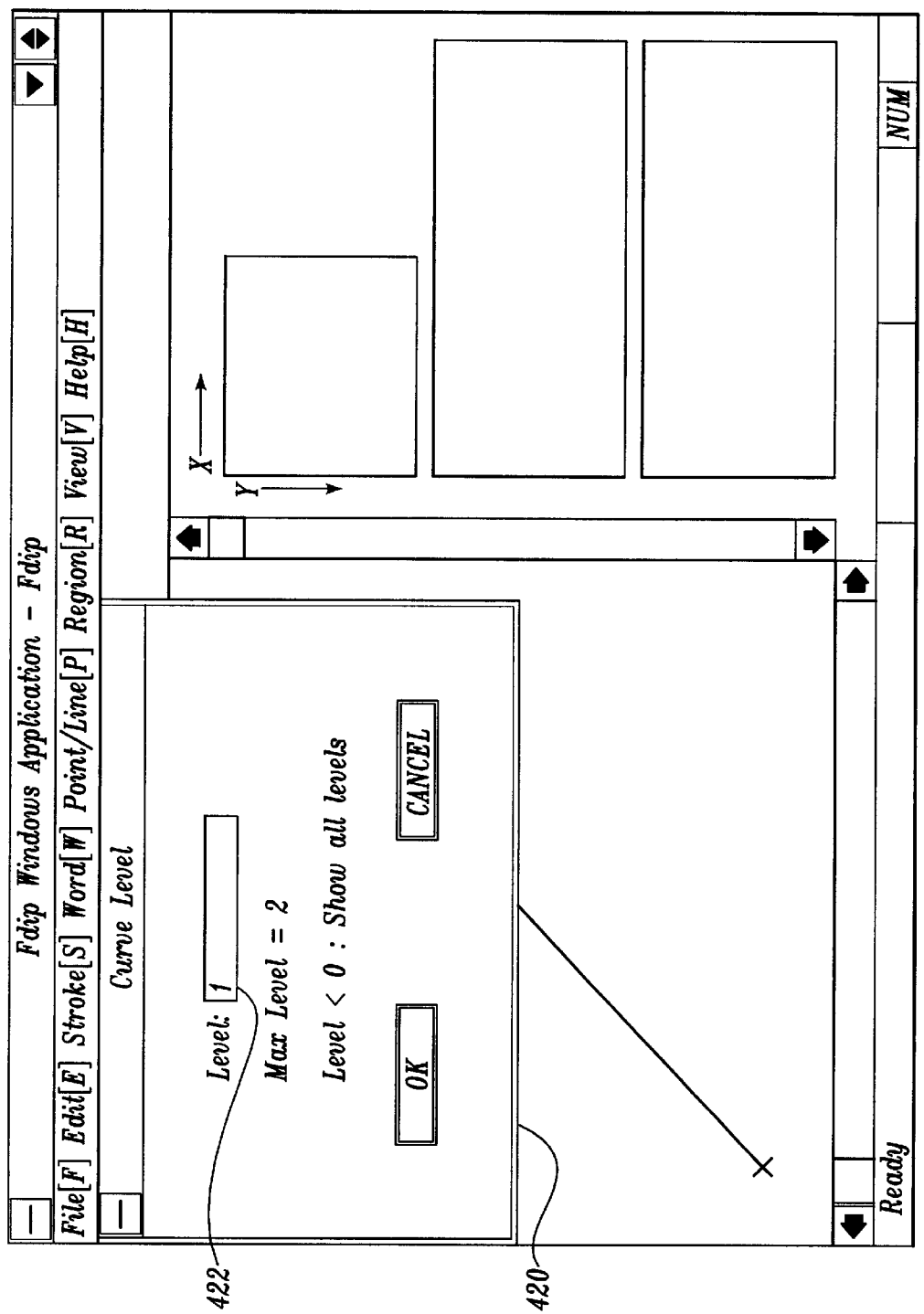
Figure 12D:
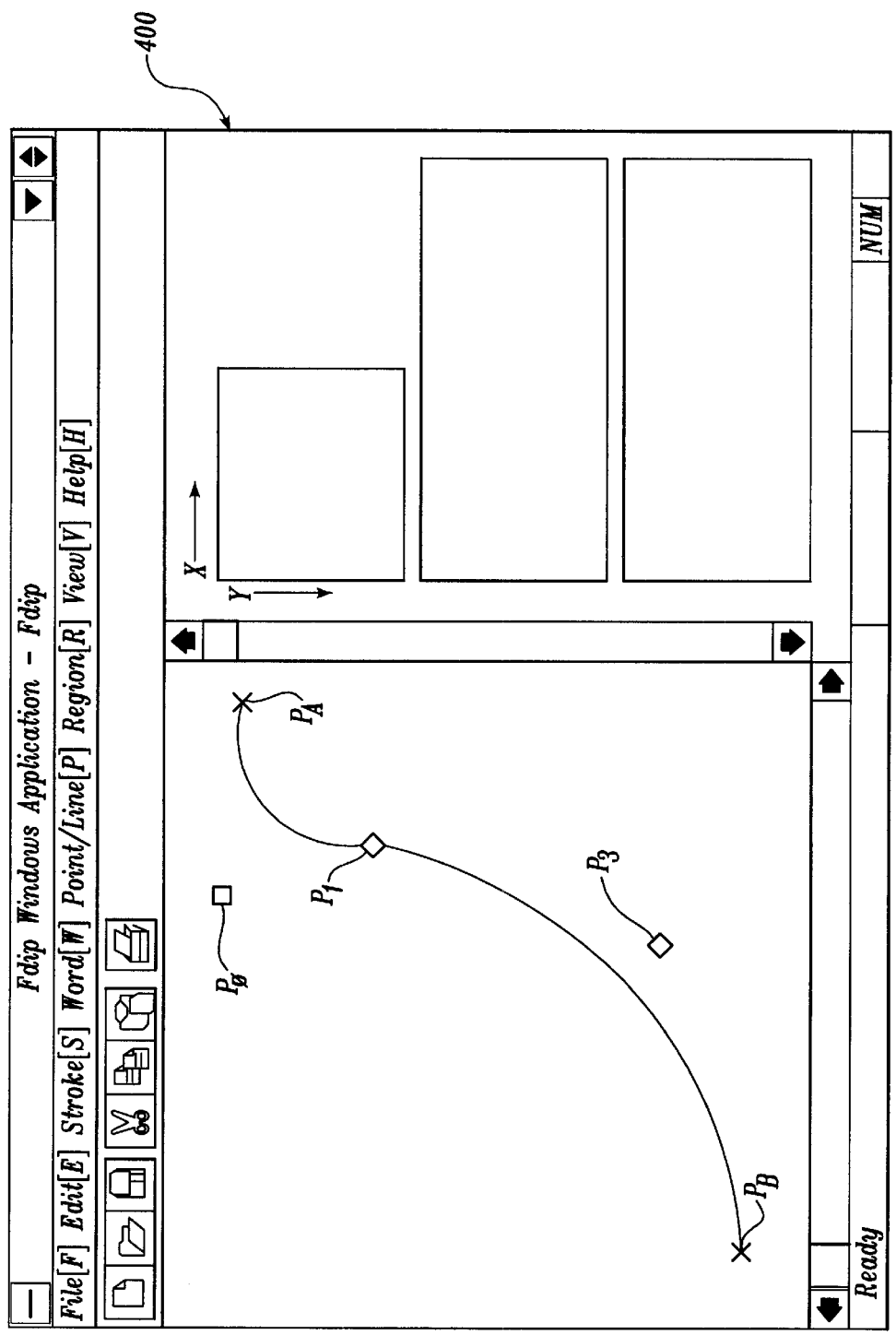

In FIG. 12C, the font designer defines curve level 1 within the curve level code block 422. Then, as shown in FIG. 12D, the initial curve segment is split into two curve segments between $P_A$ and $P_1$, and $P_1$ and $P_B$, and assigned two new midcontrol points, $P_0$ and $P_3$, respectively. These two curve segments, defined based on their curve ratios ($C(r)=L_2(x)/L_1(x)$, $L_2(y)/L_1(y)$, see FIG. 7A), are then stored at level "1".

Figure 12E:
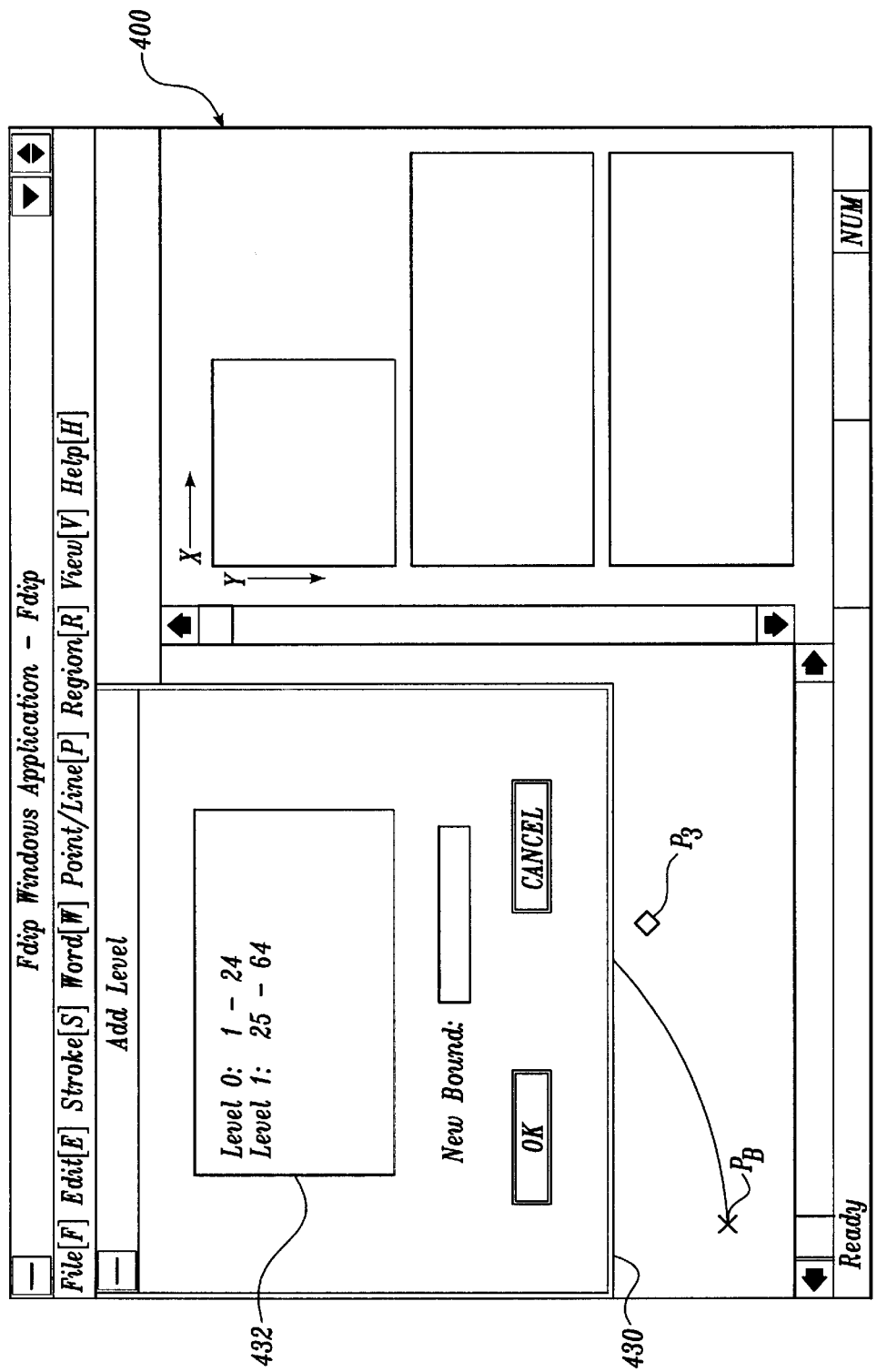

In FIG. 12E, the font designer completes curve level designation by assigning resolution boundary values to each curve level. The font designer retrieves "Add Level" window 430, which includes a resolution boundary display area 432. The display area 432 lists curve level numbers and the resolution boundaries that are assigned to respective curve level numbers. In FIG. 12E, for example, the font designer has assigned all bitmap resolution values up to and including 24×24 to Curve Level 0, and resolution values between 25×25 and 64×64 to Curve Level 1. Essentially, the font designer is assigning a resolution boundary to each curve level by visually determining the least amount of curve information required for generating acceptable curve segments at each range of resolution values. For example, if a curve segment displayed on a low-resolution display appears the same whether it is defined by a single midcontrol point or multiple midcontrol points, the font designer determines that it is wiser to define the curve segment with the single midcontrol point only, in order to save display processing time.

As described above, the present invention provides a method and system for defining a set of basic glyphs, and a method and computer-readable medium having computer-executable instructions for automatically converting an outline font into a glyph-based font using the predefined basic glyphs. The glyph-based font has a relatively low memory requirement and therefore is well suited for font communication between various devices. In a glyph-based font character, curve segments that form the outline of each glyph are defined and rendered according to the resolution level of a particular output device used. Therefore, the glyph-based font generated in accordance with the present invention can be displayed in high quality on both high- and low-resolution output devices.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A method of defining a set of basic glyphs for defining glyphs and characters based thereon, the method comprising:

a) retrieving a set of characters that include similarly shaped glyphs;

b) selecting one basic glyph that best represents the similarly shaped glyphs topographically;

c) defining feature points along the outline of the basic glyph and storing them as a glyph signature;

d) defining key points;

e) defining width values;

f) defining equations that obtain the feature points based on the key points and the width values;

g) defining script sentences that obtain the key points and the width values based on the feature points; and h) repeating steps b–g until all glyphs in the set of characters are represented by at least one basic glyph.

2. The method of claim 1, wherein step c further comprises:

i) fitting the glyph within a minimum square;

ii) identifying feature points at the leftmost, lowermost, rightmost, and uppermost edges of the minimum square;

iii) if all curve segments between two consecutive feature points are not on the same side of the line connecting the two feature points, identifying feature points at inflection points;

iv) identifying any acute-angle points as feature points; and v) forming a minimum square for each pair of adjacent feature points, and if any curve segment between the two feature points lies outside the minimum square, expanding the minimum square until it contains all curve segments between the two feature points and identifying feature points at the leftmost, lowermost, rightmost, and uppermost edges of the minimum square.

3. The method of claim 1, further comprising the step of defining curve ratios and storing them in a curve level table for creating curve segments between adjacent feature points.

4. The method of claim 1, further comprising the steps of:
dividing the basic glyph into one or more single run-length regions; and
defining each single run-length region with its left and right curve segments.

5. The method of claim 1, further comprising:
identifying a key point that requires a specific display location with respect to a bitmap cell upon which the key point falls; and
labeling the identified key point with hint information.

6. A computer graphical user interface tool system for defining a set of basic glyphs for defining glyphs and characters based thereon, the user interface tool system including an output device, processor, and memory, the tool system comprising:
means for retrieving a set of characters that include similarly shaped glyphs;
means for selecting one basic glyph that best represents the similarly shaped glyphs topographically;
means for defining feature points along the outline of the basic glyph and storing them in a glyph signature;
means for defining key points;
means for defining width values;
means for defining equations that obtain the feature points based on the key points and the width values; and
means for defining script sentences that obtain the key points and the width values based on the feature points.

7. The tool system of claim 6, wherein the means for defining feature points further comprises:
means for fitting the glyph within a minimum square;
means for identifying feature points at the leftmost, lowermost, rightmost, and uppermost edges of the minimum square;
means for identifying feature points at inflection points if all curve segments between two consecutive feature points are not on the same side of the line connecting the two feature points;
means for identifying any acute-angle points as feature points; and
means for forming a minimum square for each pair of adjacent feature points, and if any curve segment between the two feature points lies outside the minimum square, expanding the minimum square until it contains all curve segments between the two feature points and identifying feature points at the leftmost, lowermost, rightmost, and uppermost edges of the minimum square.

8. The tool system of claim 6, further comprising means for defining curve ratios and storing them in a curve level table for creating curve segments between adjacent feature points.

9. The tool system of claim 6, further comprising:
means for dividing the basic glyph into one or more single run-length regions; and
means for defining each single run-length region with its left and right curve segments.

10. The tool system of claim 6, further comprising:
means for identifying a key point that requires a specific display location with respect to a bitmap cell upon which the key point falls; and
means for labeling the identified key point with hint information.

11. A method of automatically converting an outline font character into a glyph-based font character using a set of predefined basic glyphs stored in a glyph database, each of the basic glyphs being predefined as a program for rendering the basic glyph for output, each of the basic glyphs being associated with a glyph signature consisting of feature points and further associated with script sentences that obtain key points and width values based on the feature points, the method comprising:
a) capturing an outline font character to be redefined;
b) selecting one glyph of the character;
c) identifying feature points of the selected glyph and storing them in a glyph signature;
d) retrieving from the glyph database a predefined basic glyph that topographically matches the selected glyph;
e) retrieving script sentences associated with the retrieved basic glyph, and using them and the feature points of the selected glyph identified in step c to obtain key points and width values for the selected glyph;
f) storing the selected glyph with its key points and width values obtained at step e as a program for rendering the selected glyph for output; and
g) repeating steps b–f until all glyphs in the captured character are defined.

12. The method of claim 11, wherein step d comprises retrieving a predefined basic glyph whose glyph signature matches the glyph signature of the selected glyph.

13. The method of claim 11, wherein step c further comprises:
i) fitting the selected glyph within a minimum square;
ii) identifying feature points at the leftmost, lowermost, rightmost, and uppermost edges of the minimum square;
iii) if all curve segments between two consecutive feature points are not on the same side of the line connecting the two feature points, identifying feature points at inflection points;
iv) identifying any acute-angle points as feature points; and
v) forming a minimum square for each pair of adjacent feature points, and if any curve segment between the two feature points lies outside the minimum square, expanding the minimum square until it contains all curve segments between the two feature points and identifying feature points at the leftmost, lowermost, rightmost, and uppermost edges of the minimum square.

14. The method of claim 11, wherein the program for rendering each basic glyph for output comprises:
equations for obtaining the feature points of the basic glyph based on the key points and width values of the basic glyph; and
curve ratios stored in a curve level table for creating curve segments between adjacent feature points, wherein the program for rendering the selected glyph comprises the equations and the curve ratios of the retrieved basic glyph that topographically matches the selected glyph.

15. The method of claim 14, wherein the program for rendering each basic glyph for output further comprises a filling algorithm including one or more single run-length regions, and wherein the program for rendering the selected glyph comprises the filling algorithm of the retrieved basic glyph.

16. A computer-readable medium having computer-executable instructions for automatically converting an outline font character into a glyph-based font character using a set of predefined basic glyphs stored in a glyph database, each of the basic glyphs being predefined as a program for rendering the basic glyph for output, each of the basic glyphs being associated with a glyph signature consisting of feature points and further associated with script sentences that obtain key points and width values based on the feature points, the computer-executable instructions when loaded into a computer causing the computer to execute the steps of:

a) capturing an outline font character to be redefined;

b) selecting one glyph of the character;

c) identifying feature points of the selected glyph and storing them in a glyph signature;

d) retrieving from the glyph database a predefined basic glyph that topographically matches the selected glyph;

e) retrieving script sentences associated with the retrieved basic glyph, and using them and the feature points of the selected glyph identified in step c to obtain key points and width values for the selected glyph;

f) storing the selected glyph with its key points and width values obtained at step e as a program for rendering the selected glyph for output; and g) repeating steps b–f until all glyphs in the captured character are defined.

17. The medium of claim 16, wherein step d comprises retrieving a predefined basic glyph whose glyph signature matches the glyph signature of the selected glyph.

18. The medium of claim 16, wherein step c further comprises:

i) fitting the selected glyph within a minimum square;

ii) identifying feature points at the leftmost, lowermost, rightmost, and uppermost edges of the minimum square;

iii) if all curve segments between two consecutive feature points are not on the same side of the line connecting the two feature points, identifying feature points at inflection points;

iv) identifying any acute-angle points as feature points; and v) forming a minimum square for each pair of adjacent feature points, and if any curve segment between the two feature points lies outside the minimum square, expanding the minimum square until it contains all curve segments between the two feature points and identifying feature points at the leftmost, lowermost, rightmost, and uppermost edges of the minimum square.

19. The medium of claim 16, wherein the program for rendering each basic glyph for output comprises:

equations for obtaining the feature points of the basic glyph based on the key points and width values of the basic glyph; and curve ratios stored in a curve level table for creating curve segments between adjacent feature points, wherein the program for rendering the selected glyph comprises the equations and the curve ratios of the retrieved basic glyph that topographically matches the selected glyph.

20. The medium of claim 19, wherein the program for rendering each basic glyph for output further comprises a filling algorithm including one or more single run-length regions, and wherein the program for rendering the selected glyph comprises the filling algorithm of the retrieved basic glyph.

* * * * *